(12) United States Patent
Morioka et al.

(10) Patent No.: US 7,006,852 B2
(45) Date of Patent: Feb. 28, 2006

(54) COMMUNICATION TERMINAL, POWER SAVE PROCESSING METHOD TO BE PERFORMED BY THE COMMUNICATION TERMINAL, PROGRAM FOR EXECUTING THE METHOD, AND RECORDING MEDIUM CONTAINING THE PROGRAM

(75) Inventors: Masaaki Morioka, Higashihiroshima (JP); Yoshitaka Arase, Otake (JP); Tetsuya Fuke, Otsu (JP); Wataru Tachibana, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 29 days.

(21) Appl. No.: 10/505,968

(22) PCT Filed: Sep. 30, 2003

(86) PCT No.: PCT/JP03/12465

§ 371 (c)(1),
(2), (4) Date: Aug. 27, 2004

(87) PCT Pub. No.: WO2004/034644

PCT Pub. Date: Apr. 22, 2004

(65) Prior Publication Data

US 2005/0107134 A1 May 19, 2005

(30) Foreign Application Priority Data

Oct. 10, 2002 (JP) .............................. 2002-297623

(51) Int. Cl.
*H04B 1/38* (2006.01)
*H04M 1/00* (2006.01)

(52) U.S. Cl. ...................... 455/574; 455/450; 455/451; 455/452.1; 455/452.2

(58) Field of Classification Search ................ 455/574, 455/343.1, 343.5, 450, 451, 452.1, 452.2; 370/310, 311, 330, 337, 347
See application file for complete search history.

(56) References Cited

U.S. PATENT DOCUMENTS 6,532,228 B1 * 3/2003 Burgess et al. ............. 370/349
2001/0055988 A1 * 12/2001 Blake et al. ................ 455/575

FOREIGN PATENT DOCUMENTS

| EP | 1 223 680 | 7/2002 |
| JP | 09/162798 | 6/1997 |
| WO | 00/18150 | 3/2000 |
| WO | 02/063806 | 8/2002 |

OTHER PUBLICATIONS

Ericsson et al, Specification of the Bluetooth System, Version 1.0B; Part B; Baseband Specification (pp. 98-122), Part C: Link Manager Protocol (pp. 186-244), Specification of the Bluetooth System, XX, XX, Dec. 1, 1999, XP002255785.

* cited by examiner

Primary Examiner—Curtis Kuntz
Assistant Examiner—Tuan Pham
(74) Attorney, Agent, or Firm—Wenderoth, Lind & Ponack, L.L.P.

(57) ABSTRACT

There is provided a power save processing method to be performed by a communication terminal capable of concurrently establishing communication links with a plurality of slave communication terminals, which reduces the transition time and provides an increased power save operation time. When a power save operation is performed at a plurality of slave communication terminals having asynchronous communication links established with the master communication terminal, the master communication terminal sets a communication start time and a communication duration for each communication link such that the communication slots used for the communication links are huddled together so as to span one continuous range, assuming that the communication links all have the same communication cycle. In accordance with the parameters thus set, the master communication terminal Negotiates with the plurality of slave communication terminals. Then, the master communication terminal itself performs a power save operation during the continuous period corresponding to unused slots which has been obtained through the above adjustments.

11 Claims, 21 Drawing Sheets

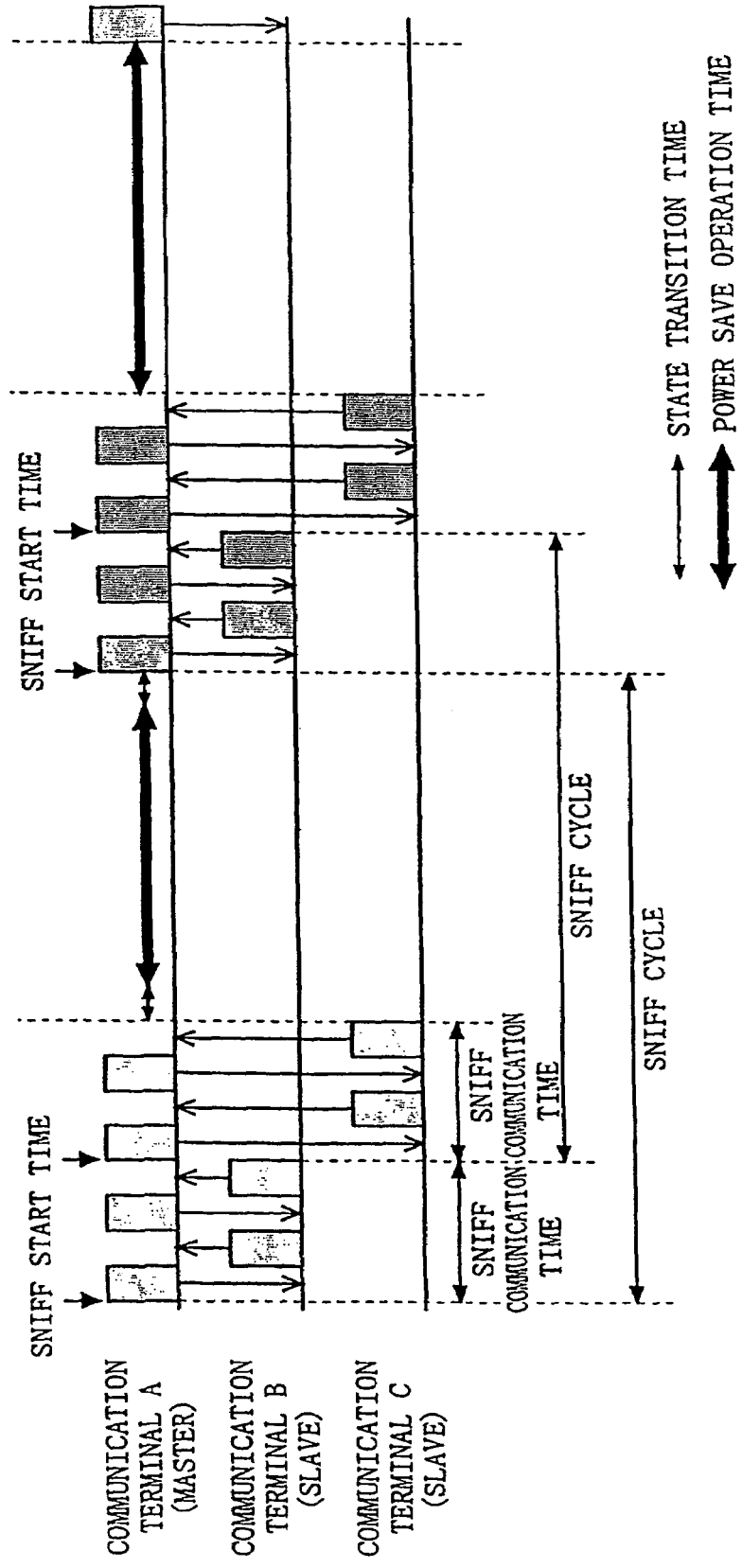
F I G. 1 8

FIG. 23 - PRIOR ART
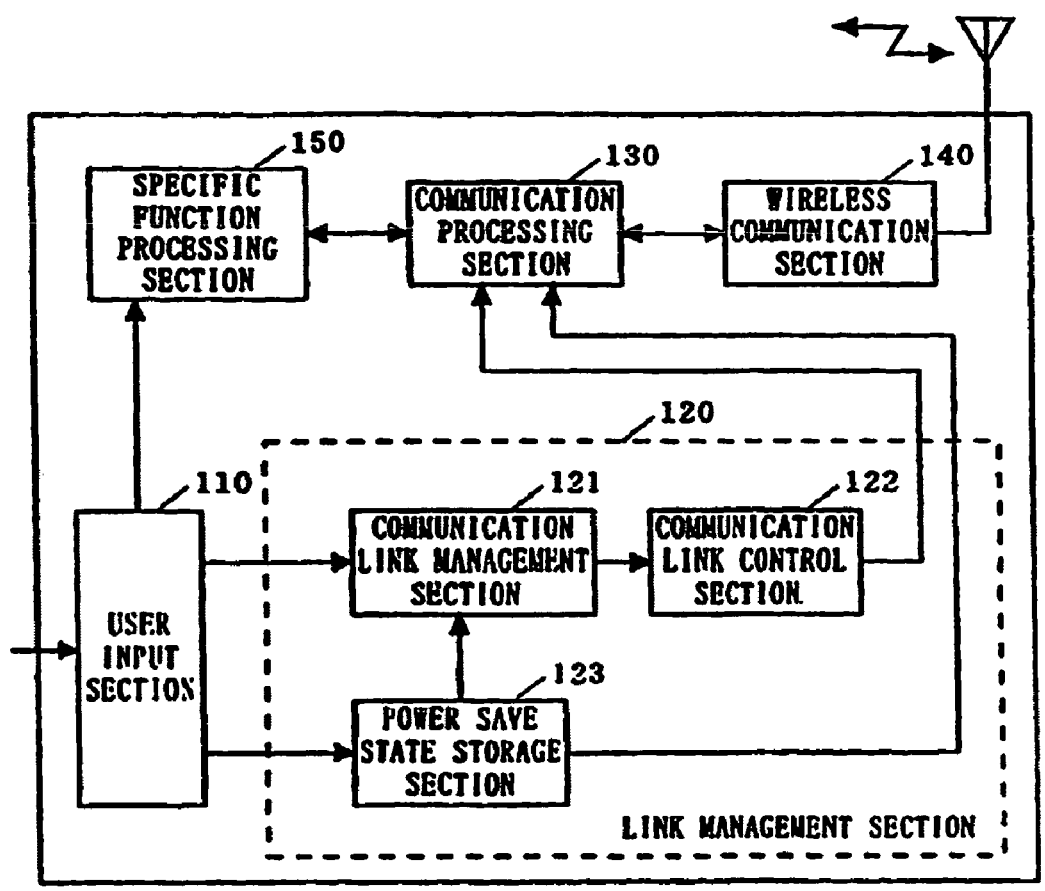

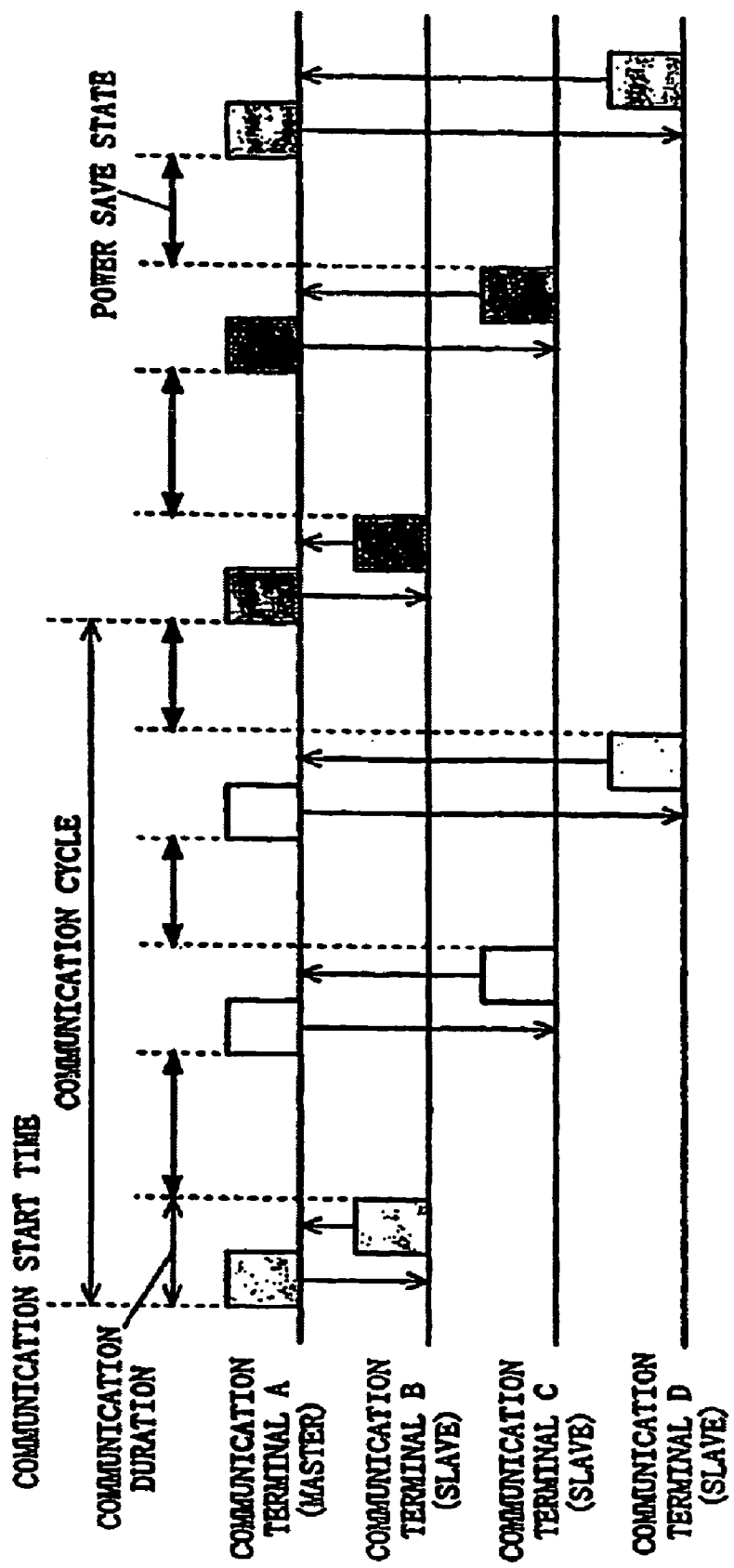
FIG. 24 - PRIOR ART

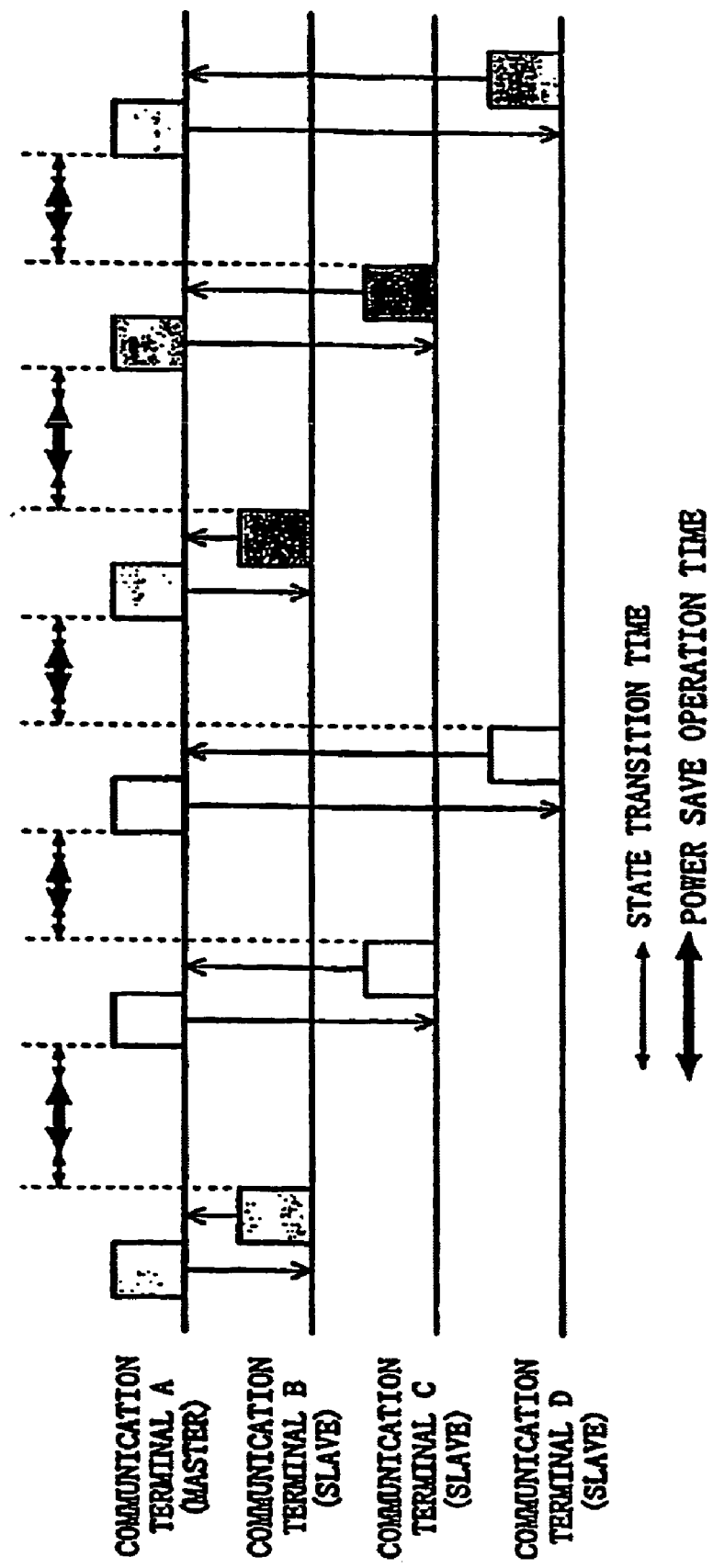
FIG. 25 - PRIOR ART

COMMUNICATION TERMINAL, POWER SAVE PROCESSING METHOD TO BE PERFORMED BY THE COMMUNICATION TERMINAL, PROGRAM FOR EXECUTING THE METHOD, AND RECORDING MEDIUM CONTAINING THE PROGRAM

TECHNICAL FIELD

The present invention relates to a communication terminal, a power save processing method to be performed, a program for executing the method, and a recording medium containing the program. More particularly, the present invention relates to a communication terminal capable of concurrently establishing communication links with a plurality of slave communication terminals, an efficient power save processing method to be performed by the communication terminal, a program for executing the method, and a recording medium containing the program.

BACKGROUND ART

In recent years, there has been an increase in the number of communication terminals, e.g., PDA (Personal Digital Assistants), cellular phones, or personal computers, which are capable of performing various functions via wireless communications, e.g., internet connection, LAN (Local Area Network) access, exchange of business card data, telephone calling, music reproduction, and the like. Although a communication terminal having such a multiplicity of functions is primarily intended to execute a single function at one time, it is also capable of simultaneously executing a plurality of functions. For example, one master communication terminal may simultaneously execute a plurality of functions between itself and a plurality of slave communication terminals.

However, when a plurality of functions are simultaneously executed, a master communication terminal will consume more power than in the traditional case of performing only one function because the master communication terminal needs to perform a communication with each slave communication terminal in order to realize each function. Therefore, a master communication terminal is usually arranged so as to minimize its power consumption, in order to maximize its battery life, for example.

Hereinafter, a commonly-used power save processing method which is performed in a conventional master communication terminal will be described. FIG. 23 is a block diagram illustrating a schematic structure of a conventional master communication terminal. In FIG. 23, the conventional master communication terminal comprises a user input section 110, a link management section 120, a communication processing section 130, a wireless communication section 140, and a specific function processing section 150. The link management section 120 includes a communication link management section 121, a communication link control section 122, and a power save operation control section 123.

The user input section 110 receives an instruction concerning a function of the master communication terminal (e.g., begin data transfer, establish a communication link, a power save command, etc.) from a user or an upper-class application. A request to establish a communication link and a power save command are passed to the link management section 120. Any other instruction is passed to the specific function processing section 150.

Based on predetermined information, the communication link management section 121 determines whether a communication link can be established with a slave communication terminal (based on the request to establish a communication link). If it is determined that the communication link can be established, the communication link management section 121 issues to the communication link control section 122 an instruction to establish a communication link. Upon receiving an instruction to establish a communication link from the communication link management section 121, the communication link control section 122 establishes a communication link with the relevant slave communication terminal by means of the communication processing section 130 and the wireless communication section 140. In accordance with a power save command from the user input section 110, the power save operation control section 123 issues to the communication link management section 121 a request for a transition of an already-established communication link to a power save mode (using a communication cycle as designated by the power save command), and instructs the corresponding slave communication terminal to transition to a power save mode, by using the communication processing section 130 and the wireless communication section 140. The power save command is issued with respect to each slave communication terminal with which a communication link has been established. The power save command contains an instruction to perform power save operation, an instruction concerning the communication cycle of communication links in the power save mode operation, and the like.

The communication processing section 130 performs processes such as a process of establishing a communication link, a process of instructing a transition to the power save mode, and a process instructed by the specific function processing section 150. The wireless communication section 140 carries out a wireless communication with a slave communication terminal. The specific function processing section 150 is a section which processes functions that are specific to the communication terminal.

In the conventional master communication terminal having the above-described structure, power saving is ensured by placing the hardware in a power save state during periods corresponding to unused communication slots, i.e., communication slots other than those used by communication links which have been established by the communication link management section 121 and the communication link control section 122 (FIG. 24). As exemplary operations to be performed during a power save state, the communication terminal may be turned off or clocked down, thereby minimizing the power consumption by hardware elements such as the CPU or peripheral devices.

A technique concerning a power save processing method which is applicable to a wireless communication system comprising an intermittent operation type mobile station, a constant operation type mobile station, and a base station is disclosed in Japanese Patent Laid-Open Publication No. 9-162798. In this technique, the base station gives priority to the data transmission/reception schedule with the intermittent operation type mobile station, thereby providing for an improved throughput and power conservation at the mobile station.

As described above, in accordance with the conventional master communication terminal, the communication cycle and the communication slot used by the communication link management section 121 and the communication link control section 122 for the communication link are arbitrarily fixed every time a request to transition to a power save mode is made. Therefore, unused slots may emerge in small, dispersed units (see FIG. 24).

On the other hand, in order to allow the hardware to transition from a normal state to a power save state or vice versa, a predetermined transition time must be observed.

Therefore, as shown in FIG. 25, in accordance with a power save operation of a conventional master communication terminal where the communication links with all slave communication terminals are allowed to transition to a power save mode, the dispersed existence of unused slots will result in a large total amount of transition time (illustrated by thin lines) being experienced, which effectively reduces the total amount of time (illustrated by thick lines) for the hardware to actually operate in a power save mode.

In the conventional technique disclosed in the aforementioned laid-open patent publication, the base station gives priority to the data transmission/reception schedule with the intermittent operation type mobile station in order to realize power conservation at the intermittent operation type mobile station. However, this technique does not envisage a power save operation at the base station in the case where a plurality of intermittent operation type mobile stations are connected.

Thus, an object of the present invention is to provide a method of reducing the transition time to provide an increased power save operation time for the hardware of a master communication terminal capable of concurrently establishing communication links with a plurality of slave communication terminals, a program for executing the method, and a recording medium containing the program.

DISCLOSURE OF THE INVENTION

The present invention is directed to a communication terminal capable of concurrently establishing communication links with a plurality of slave communication terminals. In order to achieve the above objective, the communication terminal comprises a storage section, an input section, an adjustment section, a control section, and an execution section.

The storage section is operable to store, with respect to each slave communication terminal having a communication link established thereto: a communication cycle for the communication link, a communication slot to be used by the communication link, and information concerning whether the communication link is in a predetermined power save mode for performing a predetermined power save operation. The an input section is operable to receive a request, directed to one or more of the plurality of slave communication terminals having a communication link established thereto, to cause the one or more slave communication terminals to transition to the power save mode. The adjustment section is operable to adjust the communication slots used by the communication links to all slave communication terminals to which the request is directed so that the communication slots together span a continuous range, the adjustment being made by referring to a content stored in the storage section each time the input section receives the request. The control section is operable to, in accordance with the communication slots having been adjusted by the adjustment section, cause each slave communication terminal to transition to the power save mode, and storing information indicating that the slave communication terminal is in the power save mode to the storage section. The an execution section is operable to, after all of the slave communication terminals having communication links established thereto have transitioned to the power save mode, place the communication terminal itself in a power save state during unused slots.

A permissible communication cycle range for a communication link to be established may be defined for each slave communication terminal, and if there is an overlap among the permissible communication cycle ranges of all slave communication terminals to which the request is directed, the adjustment section may adjust the communication cycle of each communication link with all such slave communication terminals so as to be a communication cycle within the overlap. In this case, the adjustment section may advantageously adjust the communication cycle of each communication link to be a maximum value within the overlap.

On the other hand, a permissible communication cycle range for a communication link to be established may be defined for each slave communication terminal, and if there is no overlap among the permissible communication cycle ranges of all slave communication terminals to which the request is directed, the adjustment section may adjust the communication cycle of each communication link with all such slave communication terminals so as to satisfy the permissible communication cycle range of each slave communication terminal and to be a multiple of an arbitrary reference communication cycle, such that the communication slots to be used by the communication links together span one continuous range at multiples of the reference communication cycle.

In order to permit other communication links to be established, it is preferable that the unused slots during which the communication terminal is placed in a power save state by the execution section are slots which fall outside of communicating periods with any of the plurality of slave communication terminals and outside of a predetermined period required to perform a preparatory operation for establishing a new communication link with a communication terminal to which no communication link is currently established.

The communication links with the plurality of slave communication terminals may be established according to the Bluetooth™ specification, in which case the power save mode of each slave communication terminal can be at least one of a hold mode and a sniff mode defined according to the Bluetooth™ specification.

In the case where at least one of the hold mode and the sniff mode is combined with a park mode defined according to the Bluetooth™ specification, the adjustment section may adjust the communication cycles and communication slots of the relevant communication links so that a hold duration defined under the hold mode and/or a sniff communication time defined under the sniff mode fit within a period during which a master communication terminal does not perform transmission as defined under the park mode and/or a period which begins after broadcast communications are completed and lasts until access windows begin.

Furthermore, in the case of complying with the Bluetooth™ specification, it is preferable that the unused slots during which the communication terminal is placed in a power save state by the execution section are slots which fall outside of communicating periods with any of the plurality of slave communication terminals and outside of a predetermined period required to periodically perform a detection (Inquiry) operation, a detection scan (Inquiry Scan) operation, and a connection scan (Page Scan) operation.

The processes performed by the storage section, the input section, the adjustment section, the control section, and the execution section of the aforementioned communication terminal can be regarded as constituting a procedure of a power save processing method, comprising the steps of: receiving a request, directed to one or more of the plurality of slave communication terminals having a communication link established thereto, to cause the one or more slave communication terminals to transition to a predetermined power save mode for performing a predetermined power save operation; each time the input section receives the request, adjusting the communication slots used by the communication links to all slave communication terminals to which the request is directed so that the communication slots together span a continuous range; in accordance with the communication slots having been adjusted, causing each slave communication terminal to transition to the power save mode; and after all of the slave communication terminals having communication links established thereto have transitioned to the power save mode, placing the communication terminal itself in a power save state during unused slots.

Preferably, the power save processing method is provided in the form of a program which causes the communication terminal to perform the aforementioned procedure. Such a program may be recorded on a computer-readable recording medium.

Thus, according to the present invention, in a configuration where a plurality of asynchronous communication links are established between one master communication terminal and a plurality of slave communication terminals, both the master and slave communication terminals are caused to transition to a power save state by adjusting the communication cycle, communication start time, and communication duration of each communication link in such a manner that the communication slots used for the respective communication links span one continuous range. As a result, a period corresponding to unused slots can be obtained as one continuous range of time, so that the master communication terminal hardware can be placed in a power save state continuously during such periods corresponding to unused slots.

If there is an overlap among the permissible ranges of communication cycles for the slave communication terminals, the communication cycle of every communication link is adjusted to the greatest maximum communication cycle available in the overlap. Even if there is no overlap among the permissible ranges, the communication slots for the communication links can be adjusted based on a reference communication cycle whose appropriate multiples fit within the respective permissible ranges. Thus, an efficient power save operation can be performed by the master communication terminal without causing communications problems.

Furthermore, the period during which to place the master communication terminal in a power save state is determined while also considering a period necessitated for the negotiation with any slave communication terminal which currently has no communication link established thereto but may have one established in the future. As a result, in the case where a new communication link is to be established after the master communication terminal has transitioned to a power save state, it is unnecessary for the master communication terminal to temporarily revert to the normal operating state from the power save state.

BRIEF DESCRIPTION OF THE DRAWINGS

FIG. 18 is a chart illustrating how communication slots for asynchronous communication links established between a master communication terminal and a plurality of slave communication terminals may be adjusted when a power save processing method is performed according to the procedure shown in FIG. 15;

FIG. 23 is a block diagram illustrating a schematic structure of a communication terminal which performs a conventional power save processing method;

FIG. 24 is a chart illustrating how communication slots for asynchronous communication links established between a master communication terminal and a plurality of slave communication terminals may be adjusted when a power save processing method according to a conventional procedure is performed; and FIG. 25 is a chart illustrating a problem which emerges when a power save processing method according to a conventional procedure is performed.

BEST MODE FOR CARRYING OUT THE INVENTION

Before presenting any detailed description of various embodiments of the present invention, the basic concept of the present invention will be described in order to facilitate the understanding thereof.

The power save processing method of the present invention is aimed at, in a configuration where a plurality of asynchronous communication links are established between one master communication terminal and a plurality of slave communication terminals, causing both the master and slave communication terminals to transition to a power save state by performing an efficient power save operation at the master communication terminal. To this end, according to the power save processing method of the present invention, communication parameters (a communication cycle, a communication start time, and a communication duration) of each communication link are adjusted.

As described earlier (see FIG. 25), according to the conventional power save processing method, communications between the master communication terminals A and the slave communication terminals B to D are performed based on mutually unrelated communication cycles and communication start times, so that, even if a power save state is entered, the master communication terminal A only spends a relatively short amount of time in. the actual power save operation. In contrast, according to the power save processing method of the present invention, the communication cycle, communication start time, and communication duration of each communication link are adjusted so that the communication slots used for the respective communications between the master communication terminals A and the slave communication terminals B to D will span one continuous range (as will be illustrated with reference to FIG. 5). As a result, the unused slots will also be huddled together so as to span one continuous range, rather than being scattered in dispersed units, so that the master communication terminal A can continuously perform a power save operation during the period corresponding to unused slots.

Hereinafter, various embodiments of the present invention will be described.

(First Embodiment)

Figure 1:
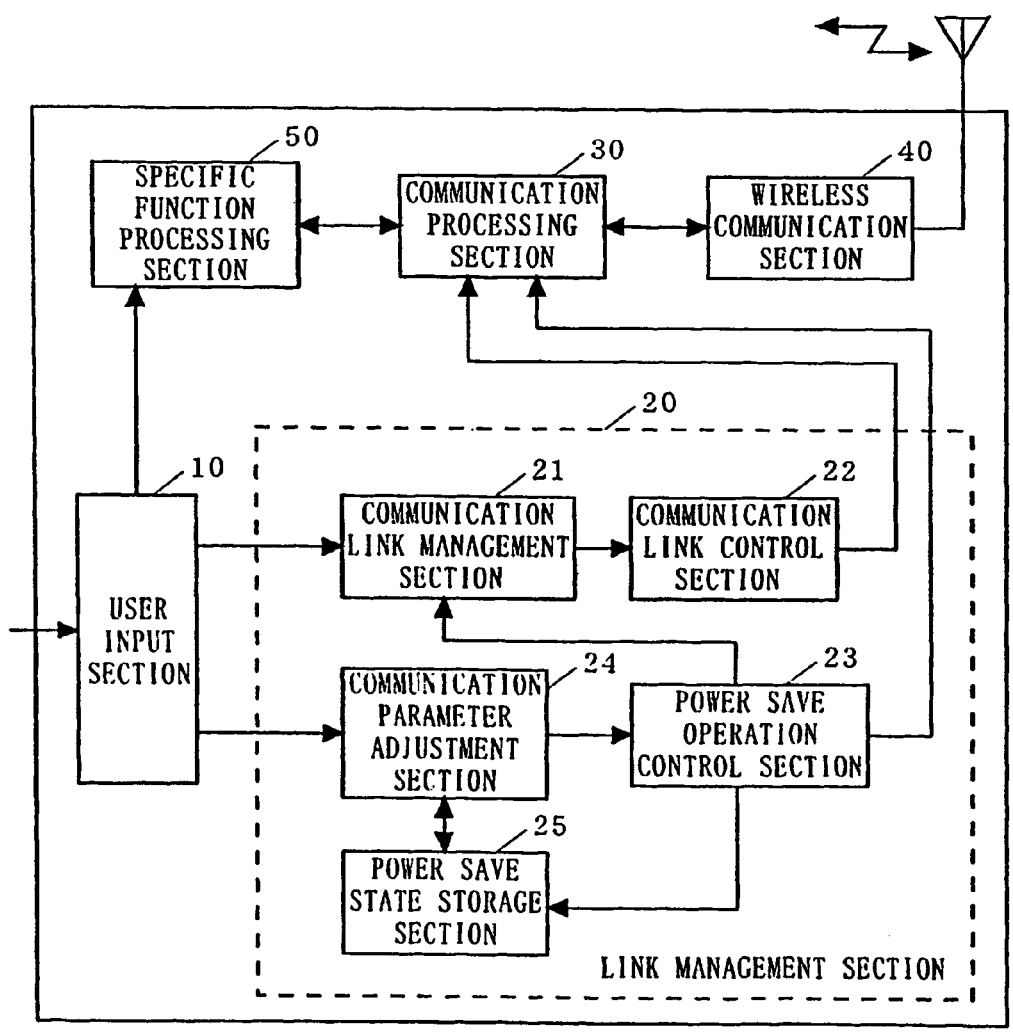
FIG. 1 is a block diagram illustrating a schematic structure of a communication terminal which performs a power save processing method according to a first embodiment of the present invention.

FIG. 1 is a block diagram illustrating a schematic structure of a communication terminal which performs a power save processing method according to a first embodiment of the present invention. In FIG. 1, the communication terminal according to the first embodiment comprises a user input section 10, a link management section 20, a communication processing section 30, a wireless communication section 40, and a specific function processing section 50. The link management section 20 includes a communication link management section 21, a communication link control section 22, a power save operation control section 23, a communication parameter adjustment section 24, and a power save state storage section 25.

First, the constituent elements of the communication terminal according to the first embodiment will be briefly described.

The user input section 10 receives an instruction concerning a function of the master communication terminal (e.g., begin data transfer, establish a communication link, a power save command, etc.) from a user or an upper-class application. A request to establish a communication link and a power save command are passed to the link management section 20. Any other instruction is passed to the specific function processing section 50.

Based on predetermined information, the communication link management section 21 determines whether a communication link can be established with a slave communication terminal (based on the request to establish a communication link). If it is determined that the communication link can be established, the communication link management section 21 issues to the communication link control section 22 an instruction to establish a communication link. Upon receiving an instruction to establish a communication link from the communication link management section 21, the communication link control section 22 establishes a communication link with the relevant slave communication terminal by means of the communication processing section 30 and the wireless communication section 40. The communication parameter adjustment section 24 receives a power save command from the user input section 10, and based on the content of the power save command and the content stored in the power save state storage section 25, adjusts and sets communication parameters concerning the relevant slave communication terminal(s) (i.e., a communication cycle, a communication start time, and a communication duration). The power save command is issued for every slave communication terminal to which a communication link has been established. The power save command contains an instruction to perform power save operation, an instruction concerning the communication cycle of communication links in the power save mode operation, and the like. The communication parameter adjustment section 24 instructs the power save operation control section 23 to perform a power save operation in accordance with the communication parameters which have been set, and stores the communication parameters and information concerning whether power save operation is being performed to the power save state storage section 25. The power save operation control section 23 issues to the communication link management section 21 a request to cause the already-established communication link(s) to transition to a power save mode in accordance with the communication parameters which have been set by the communication parameter adjustment section 24, and instructs the relevant slave communication terminal(s) to transition to a power save mode, by means of the communication processing section 30 and the wireless communication section 40.

The communication processing section 30 performs a process for establishing a communication link, a process for instructing a transition to a power save mode, a process as instructed by the specific function processing section 50, and the like. The wireless communication section 40 performs wireless communications with slave communication terminals. The specific function processing section 50 is a section which processes functions that are specific to the communication terminal. Since the specific function processing section 50 does not constitute an essential portion of the present invention, any detailed description thereof will be omitted.

Next, referring to FIGS. 2 to 6, a power save processing method according to the first embodiment of the present invention will be specifically described.

Figure 2:
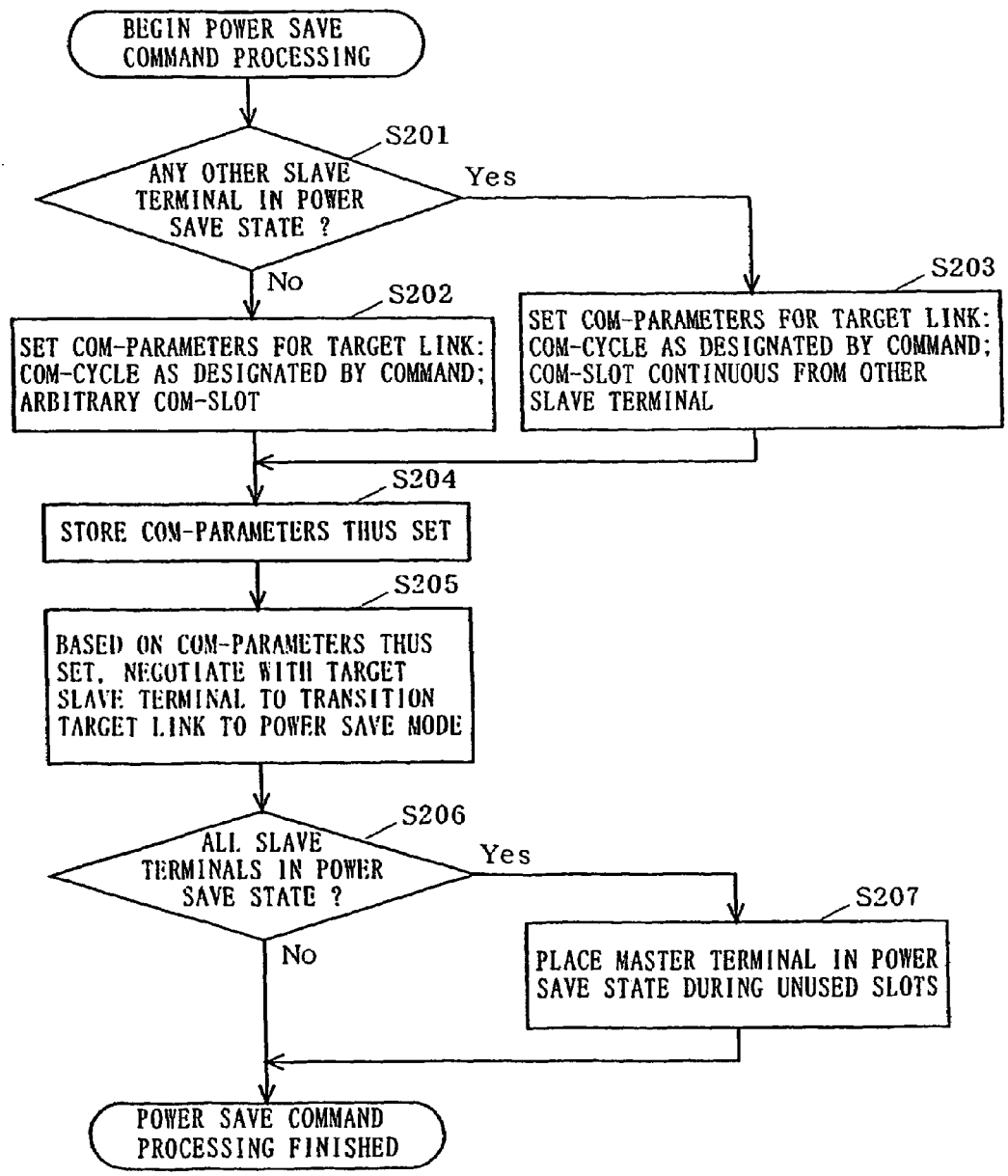
FIG. 2 is a flowchart illustrating a procedure of the power save processing method according to the first embodiment of the present invention in the case where a constant communication cycle is designated by a power save command.
Figure 3:
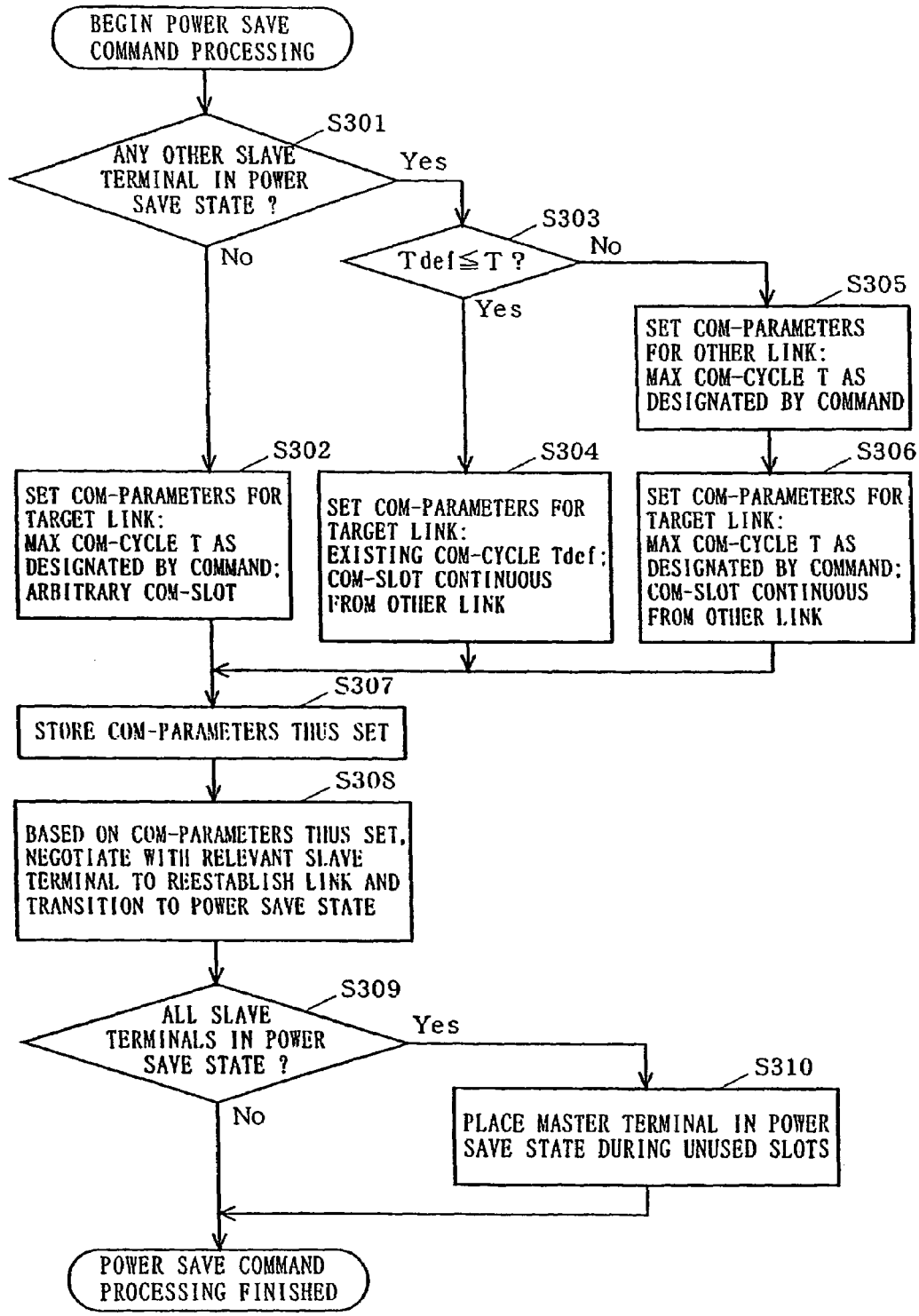
FIG. 3 is a flowchart illustrating a procedure of the power save processing method according to the first embodiment of the present invention in the case where a maximum tolerable value of the communication cycle is designated by a power save command.
Figure 4:
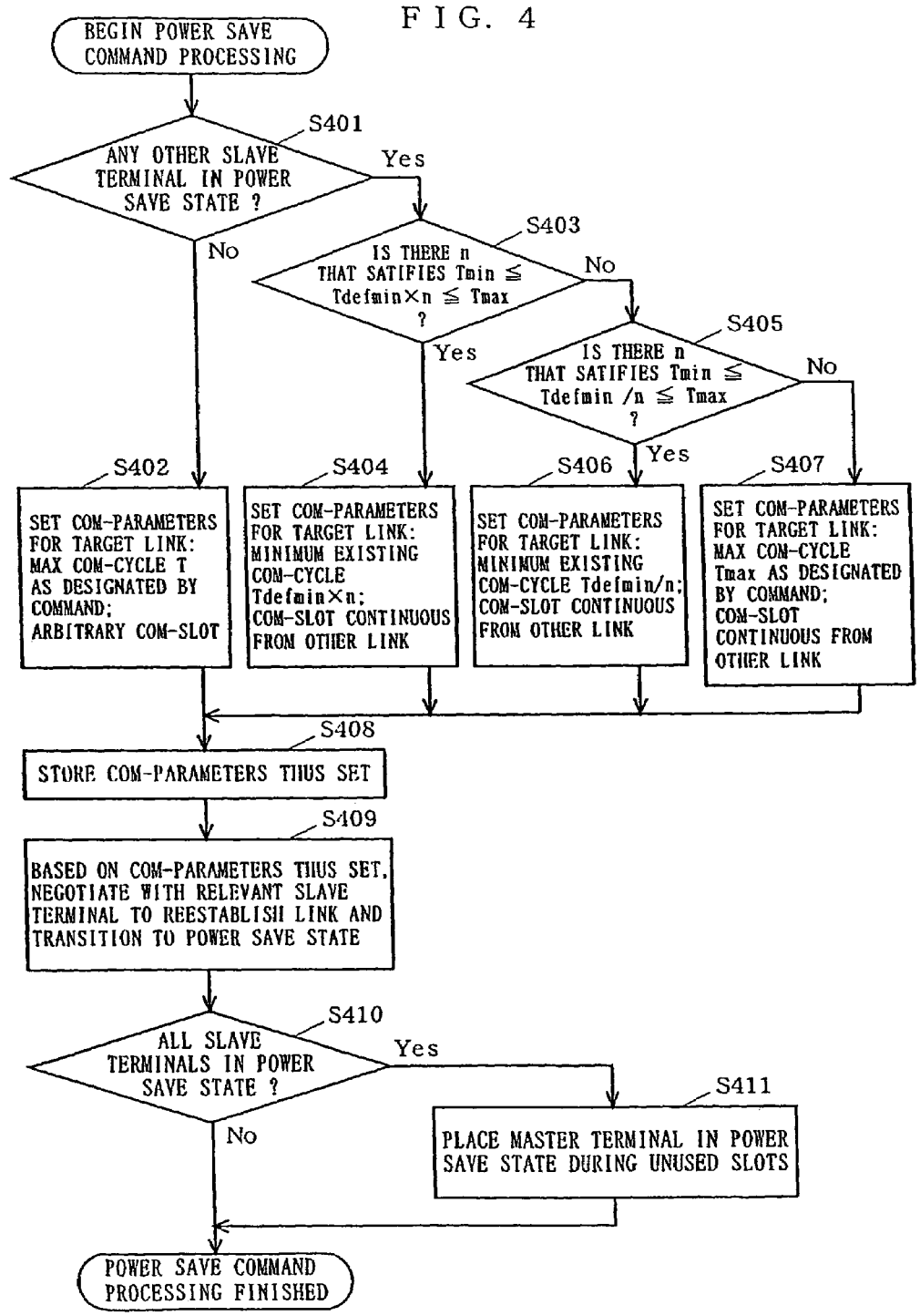
FIG. 4 is a flowchart illustrating a procedure of the power save processing method according to the first embodiment of the present invention in the case where a permissible range of the communication cycle is designated by a power save command.
Figure 5:
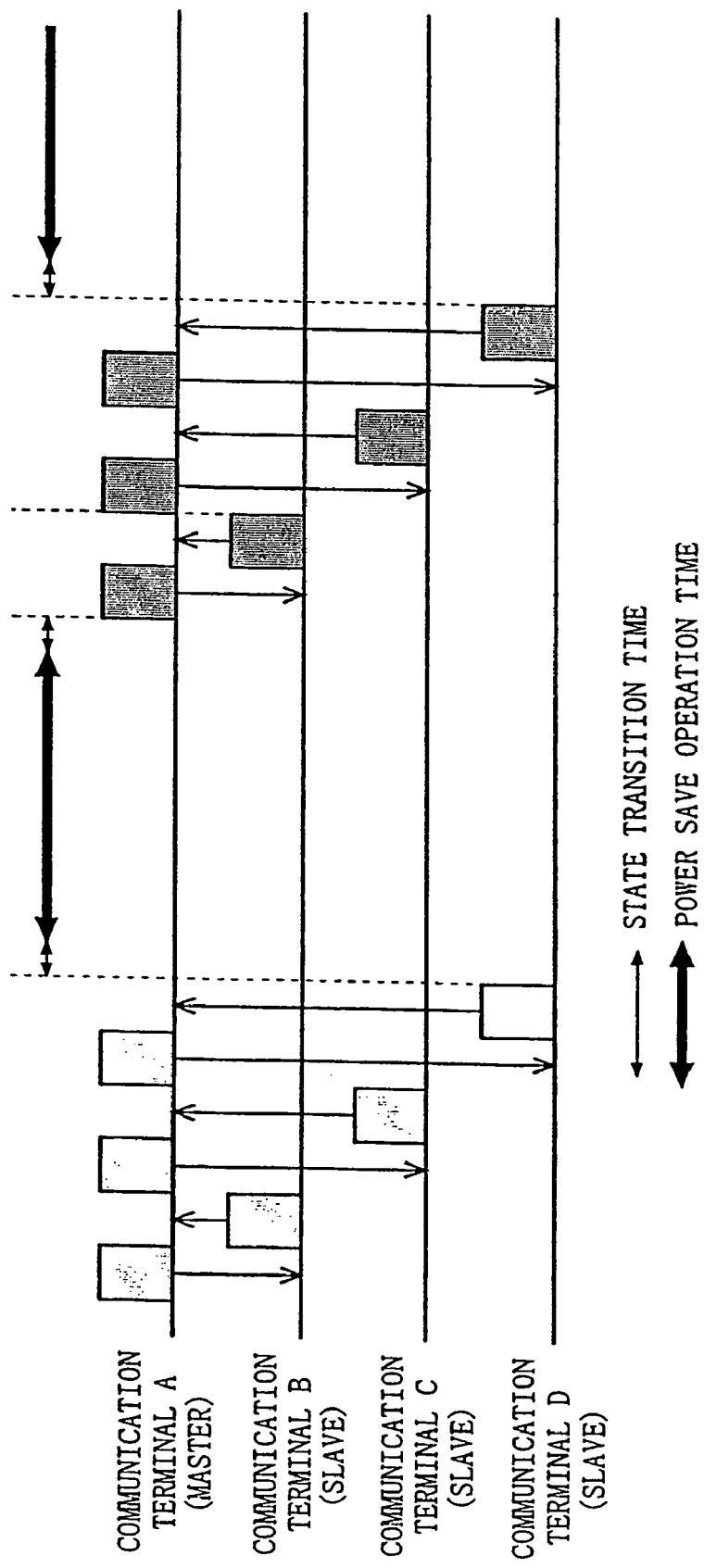
FIG. 5 is a chart illustrating how communication slots for asynchronous communication links established between a master communication terminal and a plurality of slave communication terminals may be adjusted when a power save processing method is performed according to the procedure shown in FIG. 2 or 3.
Figure 6:
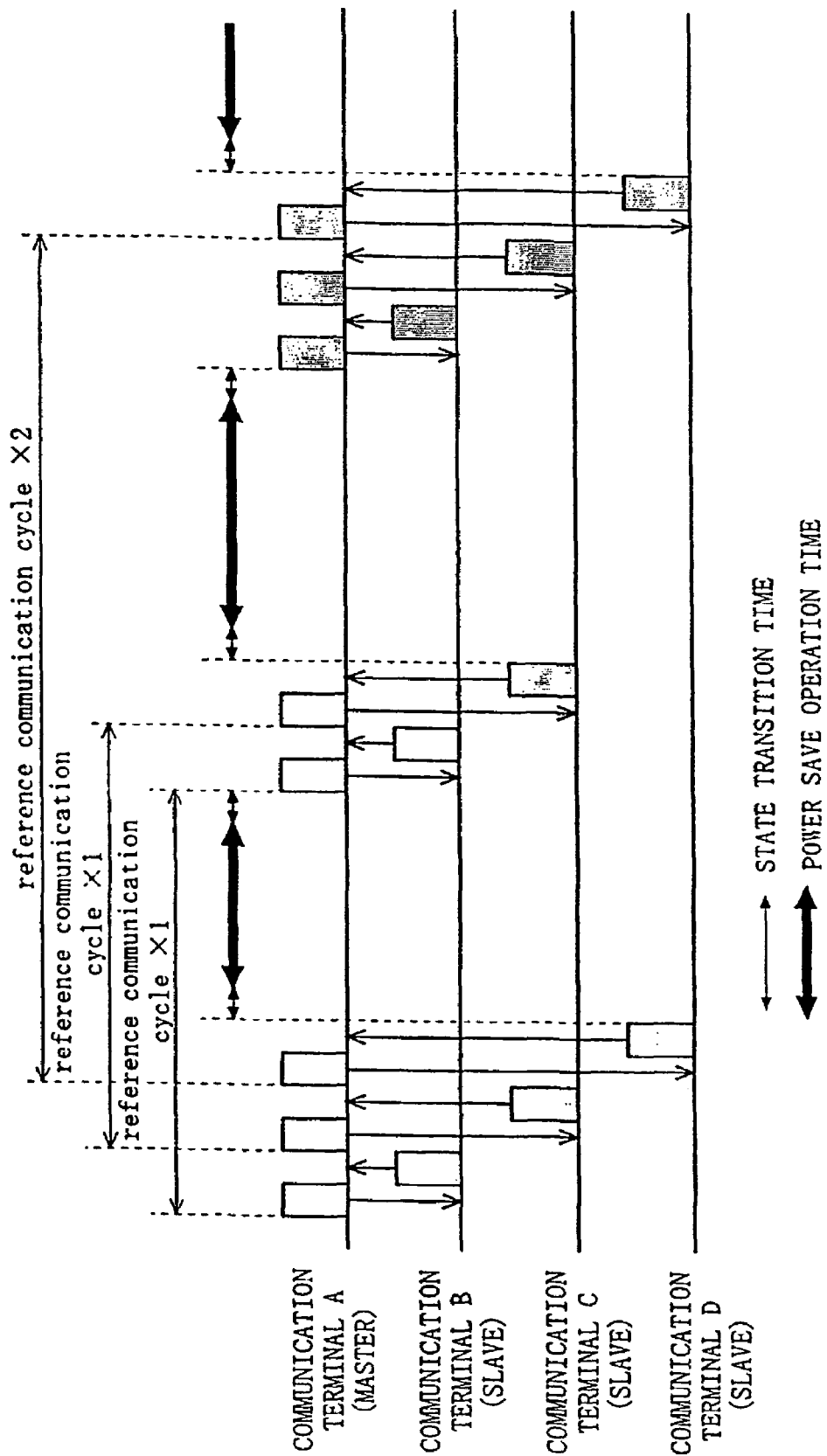
FIG. 6 is a chart illustrating how communication slots for asynchronous communication links established between a master communication terminal and a plurality of slave communication terminals may be adjusted when a power save processing method is performed according to the procedure shown in FIG. 4.

FIGS. 2 to 4 are flowcharts illustrating a procedure of the power save processing method according to the first embodiment of the present invention. FIG. 2 illustrates the case where a constant communication cycle is designated by the power save command. FIG. 3 illustrates the case where a maximum tolerable value of the communication cycle, as delayed, is designated by the power save command. FIG. 4 illustrates the case where a permissible range of the communication cycle, as delayed, is designated by the power save command. FIG. 5 is a chart illustrating how communication slots for asynchronous communication links established between a master communication terminal A and a plurality of slave communication terminals B, C, and D may be adjusted when a power save processing method is performed according to the procedure shown in FIG. 2 or 3. FIG. 6 is a chart illustrating how communication slots for asynchronous communication links established between a master communication terminal A and a plurality of slave communication terminals B, C, and D may be adjusted when a power save processing method is performed according to the procedure shown in FIG. 4.

(1) In the Case Where a Constant Communication Cycle is Designated by the Power Save Command Referring to FIG. 2, if a power save command (which always designates a constant communication cycle) that is directed to a slave communication terminal having a communication link established thereto (hereinafter referred to as a "target slave communication terminal") is received from the user input section 10, the communication parameter adjustment section 24 confirms whether there is any other slave communication terminal which is operating in a power save state, by referring to the content stored in the power save state storage section 25 (step S201). If there is no other slave communication terminal which is operating in a power save state, the communication parameter adjustment section 24 sets communication parameters (COM-PARAMETERS) concerning the communication link established with the target slave communication terminal (hereinafter referred to as a "target communication link") as follows: a communication cycle which is designated by the command is set as a "communication cycle (COM-CYCLE)"; an arbitrary time is set as a "communication start time"; and an amount of time required for the data transmission/reception is set as a "communication duration" (step S202). On the other hand, if there is another slave communication terminal which is operating in a power save state, the communication parameter adjustment section 24 sets communication parameters concerning the target communication link as follows: a communication cycle which is designated by the command is set as a "communication cycle"; a point in time at which the communication duration of the other slave communication terminal expires is set as a "communication start time"; and an amount of time required for the data transmission/reception is set as a "communication duration" (step S203). The communication parameters thus set are stored to the power save state storage section 25 (step S204). The above illustrates a function of the communication parameter adjustment section 24 as an adjustment section of communication parameters.

Based on the communication parameters having been set by the communication parameter adjustment section 24, the communication link management section 21, the communication link control section 22, and the power save operation control section 23 negotiate with the target slave communication terminal so as to cause the target communication link to transition to a power save mode in accordance with the communication parameters(step S205). The communication link management section 21, the communication link control section 22, and the power save operation control section 23 together function as a control section of power save operation of the slave communication terminal. Next, by referring to the content stored in the power save state storage section 25, the communication parameter adjustment section 24 determines whether all the slave communication terminals having communication links established thereto are operating in a power save state or not (step S206). If all such slave communication terminals are operating in a power save state, the communication parameter adjustment section 24 places the hardware of the master communication terminal in a power save state during a period which exists after communications for all the slave communication terminals have been completed and until a next round of communications is begun, i.e., a period corresponding to unused slots (step S207). The above illustrates a function of the communication parameter adjustment section 24 as an execution section of power save operation of the master communication terminal.

Through the above procedure, in the case where the same communication cycle for communication links is designated with a plurality of power save commands, the communication start times and the communication durations can be adjusted so that the communication slots for the communication links are huddled together so as to span one continuous range as shown in FIG. 5. This makes it possible to place the master communication terminal in a power save state continuously during such a range of time.

(2) In the Case Where a Maximum Tolerable Value of the Communication Cycle is Designated by the Power Save Command Referring to FIG. 3, if a power save command (which designates a maximum communication cycle T) that is directed to a target slave communication terminal is received from the user input section 10, the communication parameter adjustment section 24 confirms whether there is any other slave communication terminal which is operating in a power save state, by referring to the content stored in the power save state storage section 25 (step S301). If there is no other slave communication terminal which is operating in a power save state, the communication parameter adjustment section 24 sets communication parameters concerning the target communication link as follows: a maximum tolerable value, i.e., the maximum communication cycle T, is set as a "communication cycle"; an arbitrary time is set as a "communication start time"; and an amount of time required for the data transmission/reception is set as a "communication duration" (step S302). On the other hand, if there is another slave communication terminal which is operating in a power save state, the communication parameter adjustment section 24 determines whether or not a communication cycle Tdef which has been set for the communication link established with the other slave communication terminal (hereinafter referred to as the "other communication link") is equal to or less than the maximum communication cycle T (step S303). If the communication cycle Tdef is equal to or less than the maximum communication cycle T, the communication parameter adjustment section 24 sets communication parameters concerning the target communication link as follows: Tdef is set as the "communication cycle"; a point in time at which the communication duration of the other slave communication terminal expires is set as a "communication start time"; and an amount of time required for the data transmission/reception is set as a "communication duration" duration (step S304). On the other hand, if the communication cycle Tdef is greater than the maximum communication cycle T, the communication parameter adjustment section 24 resets the communication cycle for all other communication links to the maximum communication cycle T (step S305), and sets communication parameters concerning the target communication link as follows: the maximum communication cycle T is set as the "communication cycle"; a point in time at which the communication duration of the other slave communication terminal expires is set as a "communication start time"; and an amount of time required for the data transmission/reception is set as a "communication duration" duration (step S306). The communication parameters thus set are stored to the power save state storage section 25 (step S307).

Based on the communication parameters having been set by the communication parameter adjustment section 24, the communication link management section 21, the communication link control section 22, and the power save operation control section 23 negotiate with the target slave communication terminal or the other slave communication terminal(s) so as to cause the target communication link or the other communication links to be reestablished and transition to a power save mode in accordance with the communication parameters (step S308). Next, by referring to the content stored in the power save state storage section 25, the communication parameter adjustment section 24 determines whether all the slave communication terminals having communication links established thereto are operating in a power save state or not (step S309). If all such slave communication terminals are operating in a power save state, the communication parameter adjustment section 24 places the hardware of the master communication terminal in a power save state during a period which exists after communications for all the slave communication terminals have been completed and until a next round of communications is begun, i.e., a period corresponding to unused slots (step S310).

Through the above procedure, in the case where a maximum tolerable value of the communication cycle is designated with each power save command, the communication slots for the communication links can be huddled together so as to span one continuous range as shown in FIG. 5, based on the smallest one of the maximum communication cycle values designated by the respective power save commands. This makes it possible to place the master communication terminal in a power save state continuously during such a range of time.

(3) In the Case Where a Permissible Range of the Communication Cycle is Designated by the Power Save Command Referring to FIG. 4, if a power save command (which designates a permissible range Tmin to Tmax for the communication cycle) that is directed to a target slave communication terminal is received from the user input section 10, the communication parameter adjustment section 24 confirms whether there is any other slave communication terminal which is operating in a power save state, by referring to the content stored in the power save state storage section 25 (step S401). If there is no other slave communication terminal which is operating in a power save state, the communication parameter adjustment section 24 sets communication parameters concerning the target communication link as follows: the maximum value Tmax in the permissible range is set as a "communication cycle"; an arbitrary time is set as a "communication start time"; and an amount of time required for the data transmission/reception is set as a "communication duration" (step S402). On the other hand, if there is any other slave communication terminal which is operating in a power save state, the communication parameter adjustment section 24 extracts the minimum communication cycle Tdefmin among the communication cycles Tdef which are set for all the other communication links, and determines whether there exists a natural number n which satisfies the relationship $Tmin \leq Tdefmin \times n \leq Tmax$ (step S403).

If step S403 finds that such a natural number n exists, the communication parameter adjustment section 24 sets communication parameters concerning the target communication link as follows: $Tdefmin \times n$ (note that where a plurality of values for n exist, the largest n value is to be selected) is set as the "communication cycle"; a point in time at which the communication duration of the other slave communication terminal that uses the communication cycle Tdefmin expires is set as a "communication start time"; and an amount of time required for the data transmission/reception is set as a "communication duration" duration (step S404). On the other hand, if step S403 finds that no such natural number n exists, the communication parameter adjustment section 24 further determines whether there exists a natural number n which satisfies the relationship $Tmin \leq Tdefmin/n \leq Tmax$ (step S405).

If step S405 finds that such a natural number n exits, the communication parameter adjustment section 24 sets communication parameters concerning the target communication link as follows: Tdefmin/n (note that where a plurality of values for n exist, the smallest n value is to be selected) is set as the "communication cycle"; a point in time at which the communication duration of the other slave communication terminal that uses the communication cycle Tdefmin expires is set as a "communication start time"; and an amount of time required for the data transmission/reception is set as a "communication duration" duration (step S406). On the other hand, if step S405 finds that no such natural number n exists, the communication parameter adjustment section 24 sets communication parameters concerning the target communication link as follows: the maximum value Tmax in the designated permissible range is set as a "communication cycle"; a point in time at which the communication duration of any other arbitrary slave communication terminal expires is set as a "communication start time"; and an amount of time required for the data transmission/reception is set as a "communication duration" (step S407). The communication parameters thus set are stored to the power save state storage section 25 (step S408).

Based on the communication parameters having been set by the communication parameter adjustment section 24, the communication link management section 21, the communication link control section 22, and the power save operation control section 23 negotiate with the target slave communication terminal or the other slave communication terminal(s) so as to cause the target communication link to be reestablished and transition to a power save mode in accordance with the communication parameters (step S409). Next, by referring to the content stored in the power save state storage section 25, the communication parameter adjustment section 24 determines whether all the slave communication terminals having communication links established thereto are operating in a power save state or not (step S410). If all such slave communication terminals are operating in a power save state, the communication parameter adjustment section 24 places the hardware of the master communication terminal in a power save state during a period which exists after communications for all the slave communication terminals have been completed and until a next round of communications is begun, i.e., a period corresponding to unused slots (step S411).

Through the above procedure, in the case where a permissible range of the communication cycle is designated with each power save command, if there is an overlap among a plurality of permissible ranges thus designated, the communication slots for the communication links can be huddled together so as to span one continuous range as shown in FIG. 5, based on the greatest maximum communication cycle available in the overlap. Even if there is no such overlap, the communication slots for the communication links can be huddled together so as to span one continuous range at multiples of the communication cycle, as shown in FIG. 6, based on a reference communication cycle whose appropriate multiples fit within the respective permissible ranges. This makes it possible to place the master communication terminal in a power save state continuously during such a range of time.

Thus, with the power save processing method according to the first embodiment of the present invention, in a configuration where a plurality of asynchronous communication links are established between one master communication terminal and a plurality of slave communication terminals, both the master and slave communication terminals are caused to transition to a power save state by adjusting the communication cycle, communication start time, and communication duration of each communication link in such a manner that the communication slots used for the respective communication links span one continuous range. As a result, a period corresponding to unused slots can be obtained as one continuous range of time, so that the master communication terminal hardware can be placed in a power save state continuously during such periods corresponding to unused slots.

(Second Embodiment)

The power save processing method illustrated in the first embodiment above only considers the relationship with slave communication terminals to which communication links are currently established. In the case where new communication links are to be established after the master communication terminal is transitioned to a power save state, however, preparatory operations for the establishment of new communication links must be periodically performed.

Therefore, a second embodiment of the present invention illustrates a power save processing method which determines the period for placing the master communication terminal in a power save state by considering the periods of time required to perform periodical preparatory operations for the establishment of new communication links.

Figure 7:
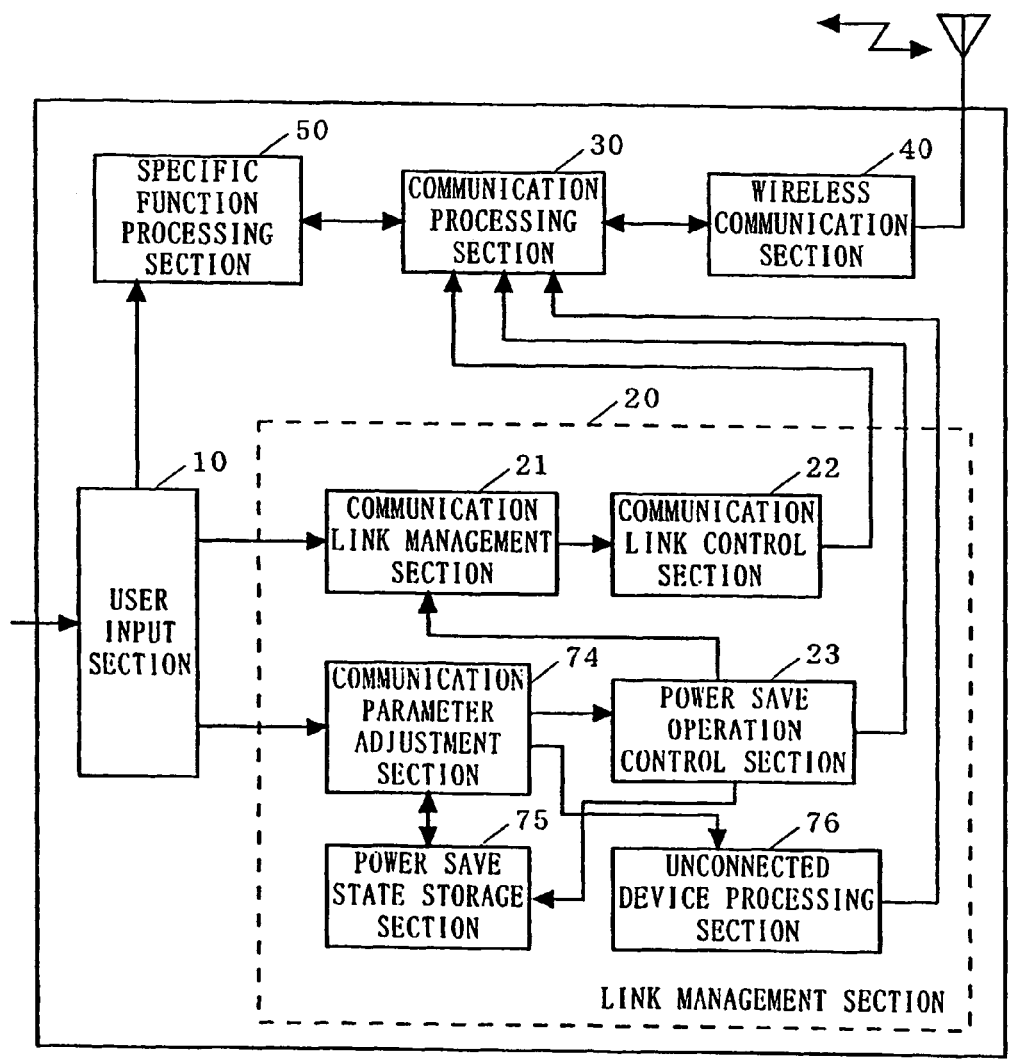
FIG. 7 is a block diagram illustrating a schematic structure of a communication terminal which performs a power save processing method according to a second embodiment of the present invention.

FIG. 7 is a block diagram illustrating a schematic structure of a communication terminal which performs a power save processing method according to the second embodiment of the present invention. In FIG. 7, the communication terminal according to the second embodiment comprises a user input section 10, a link management section 20, a communication processing section 30, a wireless communication section 40, and a specific function processing section 50. The link management section 20 includes a communication link management section 21, a communication link control section 22, a power save operation control section 23, a communication parameter adjustment section 74, a power save state storage section 75, and an unconnected device processing section 76.

As shown in FIG. 7, the communication terminal according to the second embodiment of the present invention differs from the communication terminal according to the first embodiment as illustrated in FIG. 1 with respect to the communication parameter adjustment section 74, the power save state storage section 75, and the unconnected device processing section 76. Hereinafter, the second embodiment will be described mainly with respect to these differences.

Generally speaking, in order to establish a new communication link in a wireless communication system, it is necessary to periodically perform a preparatory operation for the establishment of the new communication link (hereinafter simply referred to as a "preparatory operation"), in accordance with an detection command and a reception/response permission command (hereinafter generally referred to as "unconnected device communication commands"). As used herein, the preparatory operation includes: an operation of finding a communication terminal that is present in a range in which wireless connection is enabled (transmitting a detection packet to neighboring devices), which is performed in accordance with a detection command; a detection scan operation by a communication terminal that is present in the range in which wireless connection is enabled (i.e., periodically placing the wireless communication section 40 in a reception mode and transmitting a detection response packet upon receiving a detection packet), which is performed in accordance with a reception/response permission command; and a connection scan operation (i.e., periodically placing the wireless communication section 40 in a reception mode and transmitting a connection response packet upon receiving a connection packet). The period of time required for the preparatory operation (hereinafter referred to as "unconnected device processing time") and its cycle are determined before the preparatory operation is begun, and are stored to the power save state storage section 75 according to the second embodiment.

In accordance with the content of the power save command which has been sent from the user input section 10 and the content stored in the power save state storage section 75, the communication parameter adjustment section 74 adjusts communication parameters concerning the relevant slave communication terminal. The communication parameter adjustment section 74 instructs the power save operation control section 23 to perform a power save operation in accordance with the communication parameters which have been set, and stores the communication parameters and information concerning whether power save operation is being performed to the power save state storage section 75. Furthermore, the communication parameter adjustment section 74 determines the period for placing the master communication terminal in a power save state by considering the unconnected device processing time stored in the power save state storage section 75. Upon receiving an unconnected device communication command from the user input section 10 via the communication parameter adjustment section 74, the unconnected device processing section 76 performs a detection (to find an unconnected slave communication terminal), a detection scan, or a connection scan as designated.

Figure 8:
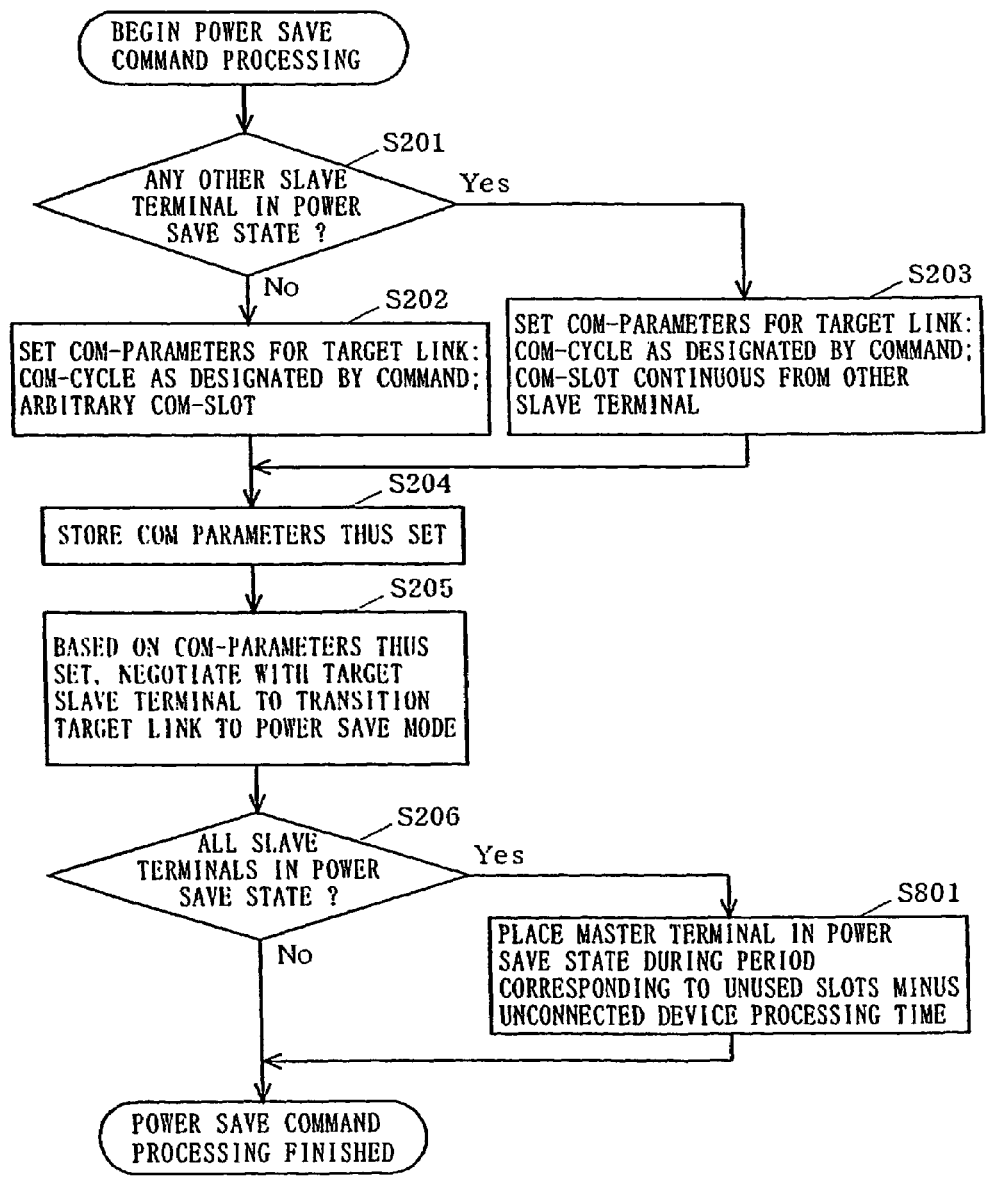
FIG. 8 is a flowchart illustrating a procedure of the power save processing method according to the second embodiment of the present invention in the case where a constant communication cycle is designated by a power save command.
Figure 9:
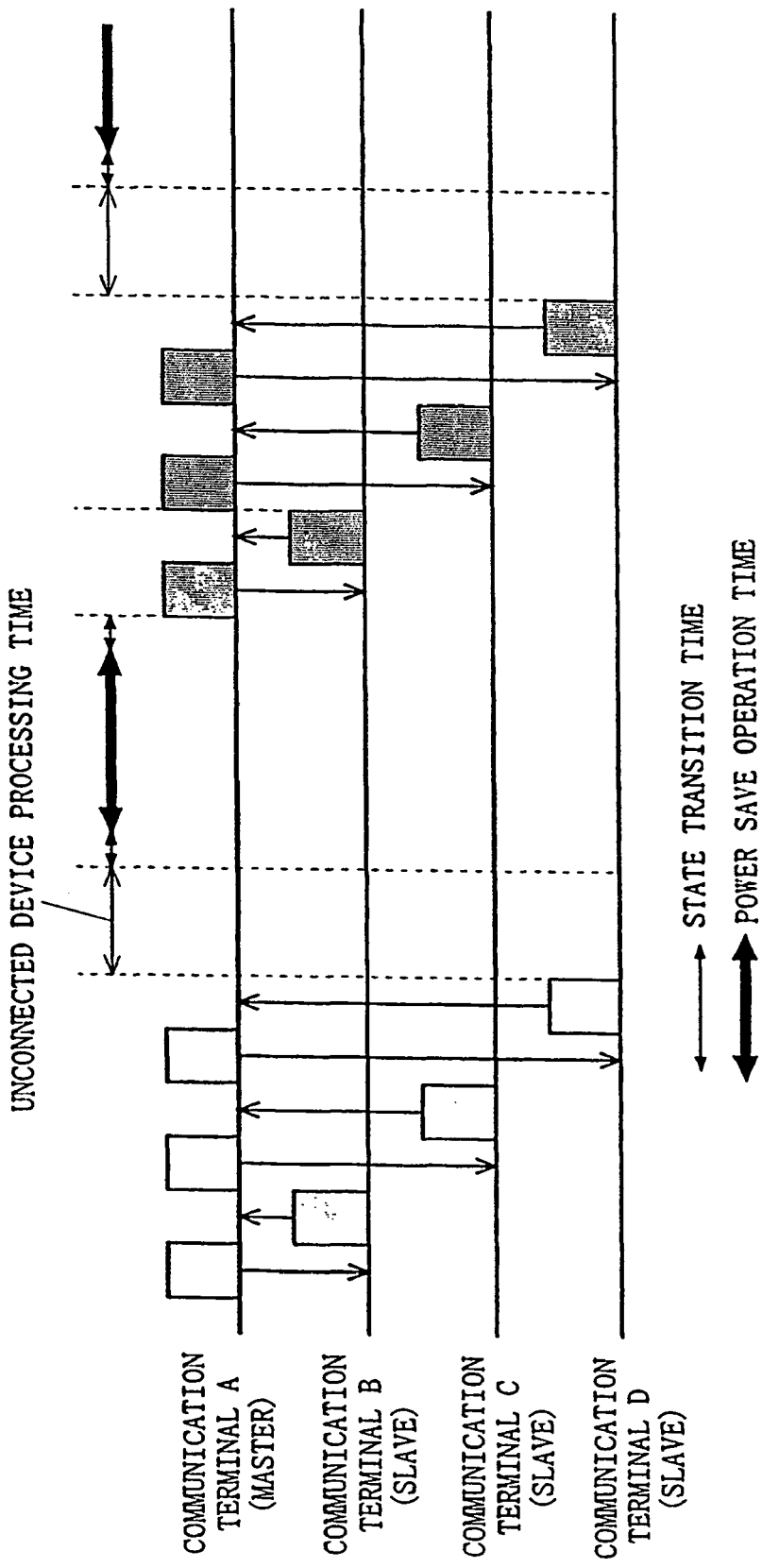
FIG. 9 is a chart illustrating how communication slots for asynchronous communication links established between a master communication terminal and a plurality of slave communication terminals may be adjusted when a power save processing method is performed according to the procedure shown in FIG. 8.

FIG. 8 is a flowchart illustrating a procedure of the power save processing method according to the second embodiment of the present invention in the case where a constant communication cycle is designated by a power save command. FIG. 9 is a chart illustrating how communication slots for asynchronous communication links established between a master communication terminal A and a plurality of slave communication terminals B to D may be adjusted when a power save processing method is performed according to the procedure shown in FIG. 8. In FIG. 8, those steps which have their counterparts in FIG. 2 are denoted by like numerals.

By referring to the content stored in the power save state storage section 75, the communication parameter adjustment section 74 determines whether all the slave communication terminals having communication links established thereto are operating in a power save state or not (step S206). If all such slave communication terminals are operating in a power save state, the communication parameter adjustment section 74 places the hardware of the master communication terminal in a power save state during a period which exists after communications for all the slave communication terminals have been completed and until a next round of communications is begun, i.e., a period corresponding to unused slots, minus the unconnected device processing time as stored in the power save state storage section 75 (step S801).

Through the above procedure, the communication slots for the communication links and the unconnected device processing time can be huddled together so as to span one continuous range as shown in FIG. 9. This makes it possible to place the master communication terminal in a power save state during a continuous period corresponding to unused slots.

Figure 10:
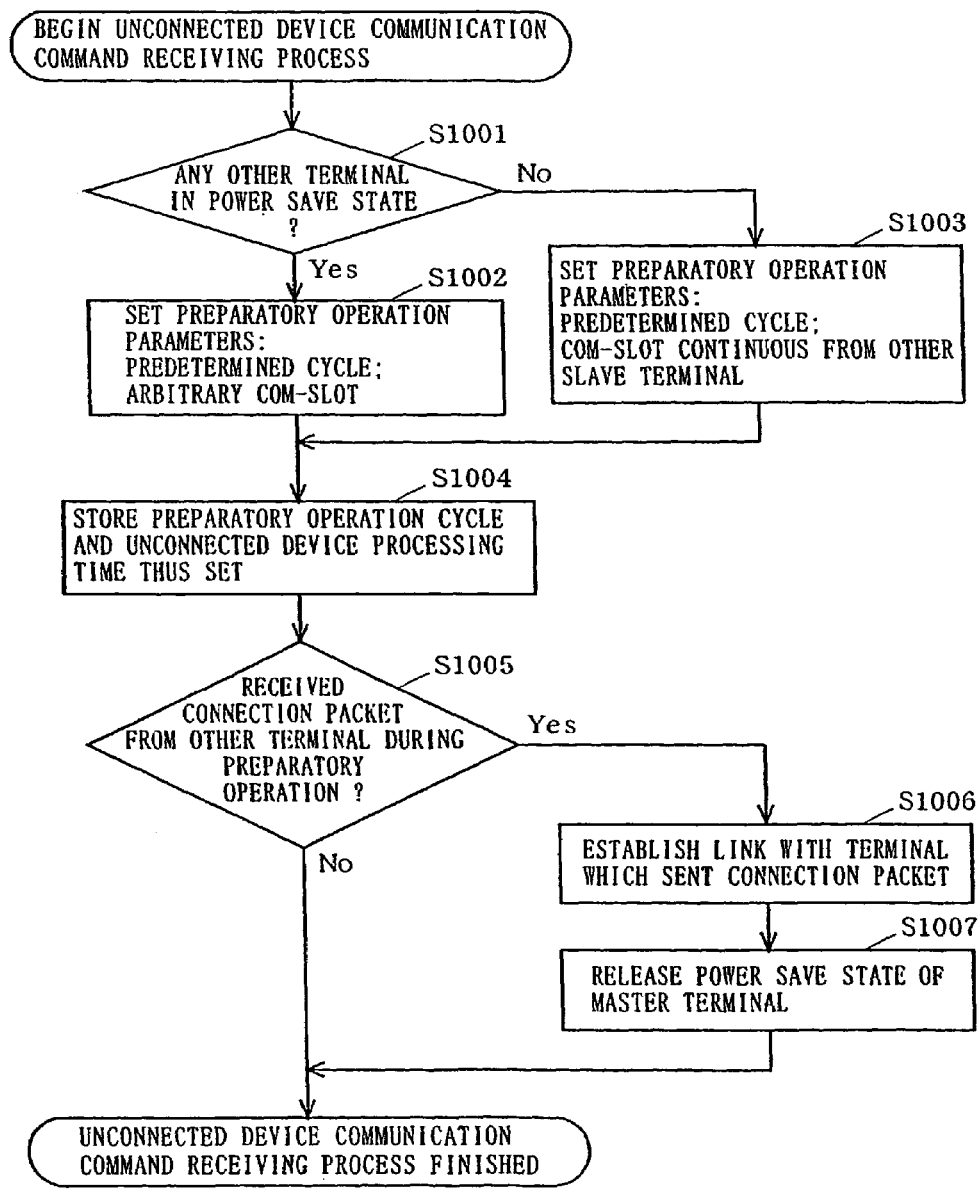
FIG. 10 is a flowchart illustrating a procedure of an unconnected device communication process based on the power save processing method according to the second embodiment of the present invention.

Next, the processing performed by the master communication terminal (the link management section 20) in response to an unconnected device communication command will be described with reference to FIG. 10.

Upon receiving an unconnected device communication command from the user input section 10, the communication parameter adjustment section 74 confirms whether there is any other slave communication terminal which is operating in a power save state (step S1001). If there is no other slave communication terminal which is operating in a power save state, the unconnected device processing section 76 sets parameters concerning the preparatory operation as follows: a predetermined cycle is set; and an arbitrary slot is set as an "unconnected device processing time" (or a corresponding period corresponding to unused slots) (step S1002). On the other hand, if there is another slave communication terminal which is operating in a power save, the unconnected device processing section 76 sets parameters concerning the preparatory operation as follows: a predetermined cycle is set; and an "unconnected device processing time" is set from a point in time at which the communication duration of the other slave communication terminal expires (step S1003). The parameters concerning the preparatory operation thus set are stored to the power save state storage section 75 (step S1004).

Thereafter, if a connection packet is received from another communication terminal during the preparatory operation (step S1005, Yes), a new communication link is established by means of the communication link management section 21 and the communication link control section 22 (step S1006). The newly-established communication link is not in a power save mode yet; therefore, the communication parameter adjustment section 74 release the power save state of the master communication terminal (step S1007). Once a power save command is issued for the newly-established communication link, so that all communication links have transitioned to a power save mode, the master communication terminal places the hardware of the master communication terminal in a power save state during periods corresponding to unused slots.

Thus, with the power save processing method according to the second embodiment of the present invention, the period for placing the master communication terminal in a power save state is determined by considering the periods of time required to perform preparatory operations for the establishment of new communication links. This allows preparatory operations for establishing new communication links to be performed while placing the master communication terminal in a power save state.

The second embodiment illustrates an example where a technique of considering the unconnected device processing time is applied to the case of FIG. 2 where a constant communication cycle is designated by the power save command. However, it will be appreciated that the unconnected device communication command processing shown in FIG. 10 can be similarly applied in the case of FIG. 3 where a maximum tolerable value of the communication cycle is designated by the power save command, or the case of FIG. 4 where a permissible range of the communication cycle is designated by the power save command, whereby the communication slots for the established communication links and the preparatory operation processing time can be huddled together so as to span one continuous range.

(Third Embodiment)

The first and second embodiments above each illustrate a case where the power save processing method according to the present invention is applied to a generic wireless communication system.

A third embodiment of the present invention illustrates a case where the power save processing method according to the present invention is applied to Bluetooth™ technology, as a representative communication technique which enables simultaneous use of a plurality of functions. For details of Bluetooth communications, see Kazuhiro Miyatsu, "Technology Kaitaishinsho Bluetooth Gijutsu Guide", 1st ed., Ric Telecom, Ltd., Jun. 11, 2001.

Figure 11:
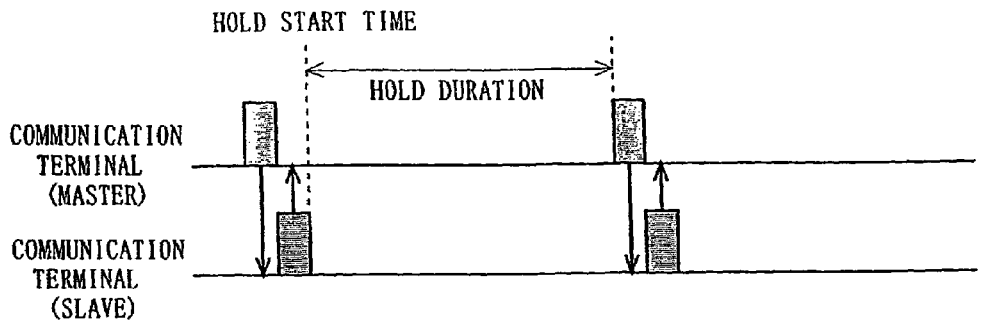
FIG. 11 is a chart illustrating a hold mode defined by the Bluetooth specification.
Figure 12:
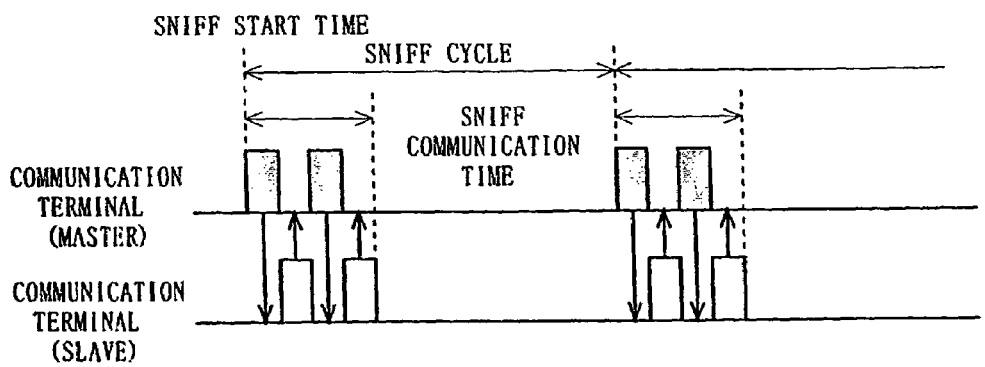
FIG. 12 is a chart illustrating a sniff mode defined by the Bluetooth specification.
Figure 13:
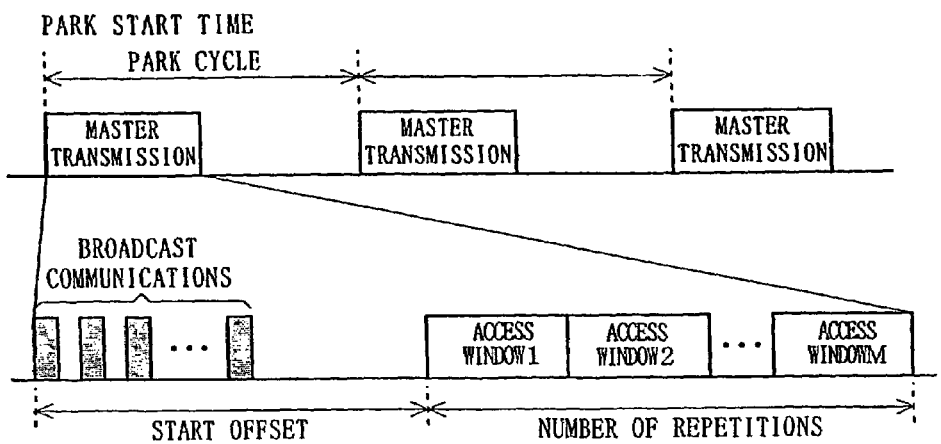
FIG. 13 is a chart illustrating a park mode defined by the Bluetooth specification.

First, the portion of the Bluetooth specification which is relevant to the present invention will be briefly described. The Bluetooth specification defines three low power consumption modes for realizing a power save operation. The low power consumption modes include a hold mode (FIG. 11), a sniff mode (FIG. 12), and a park mode (FIG. 13).

The hold mode is a mode in which a single period of not performing a communication (hereinafter referred to as a "non-communicating period") is defined between a master communication terminal and a slave communication terminal, so as to perform a power save operation during the non-communicating period. In order to enter the hold mode, it is necessary to determine between the master and slave communication terminals a hold start time (the point in time at which a non-communicating period starts) and a hold duration (the length of the non-communicating period), by using a hold command.

The sniff mode is a mode in which a period of performing communications and a non-communicating period is defined for every cycle between a master communication terminal and a slave communication terminal, so as to periodically perform a power save operation during every non-communicating period. During the period of performing communications, data packets can be transmitted/received bidirectionally between the master communication terminal and the slave communication terminal. In order to enter the sniff mode, it is necessary to determine between the master and slave communication terminals a sniff start time (a time offset for starting periodic communications) and a sniff communication time (the length of the period of performing communications), a sniff cycle (a cycle for beginning communications periodically), and the like, by using a sniff command.

The park mode is a mode similar to the sniff mode, in which a period of performing communications and a non-communicating period is defined for every cycle between a master communication terminal and a slave communication terminal, so as to perform a power save operation during every non-communicating period. However, during the period of performing communications, data packets cannot be exchanged between the master communication terminal and the slave communication terminal, and it is only possible to perform broadcast communications from the master communication terminal to the slave communication terminal. In order to enter the park mode, it is necessary to determine between the master and slave communication terminals a park start time (a time offset for starting periodic broadcast communications from the master communication terminal), a park cycle (a cycle with which periodic broadcast communications are started), intervals between broadcast communications and a number of broadcast communications to be repeated, and the start time of access windows (i.e., periods during which a slave communication terminal can request the master communication terminal to return to a normal communicating state), intervals between access windows, a number of access windows to be repeated, and the like, by using a park command.

The communication terminal which performs a power save processing method according to the third embodiment of the present invention has the same schematic structure as that of the communication terminal according to the first or second embodiment (FIG. 1 or FIG. 7). The third embodiment illustrates an example where the communication terminal is used to perform the three low power consumption modes defined under the Bluetooth specification, where the communication slots to be used for the communication links are huddled together as described in the first and second embodiments so as to enable power save operation in a continuous period corresponding to unused slots. The following description is directed to the case where the process described in the first embodiment is applied to the aforementioned three low power consumption modes.

(1) When Receiving a Hold Command

Figure 14:
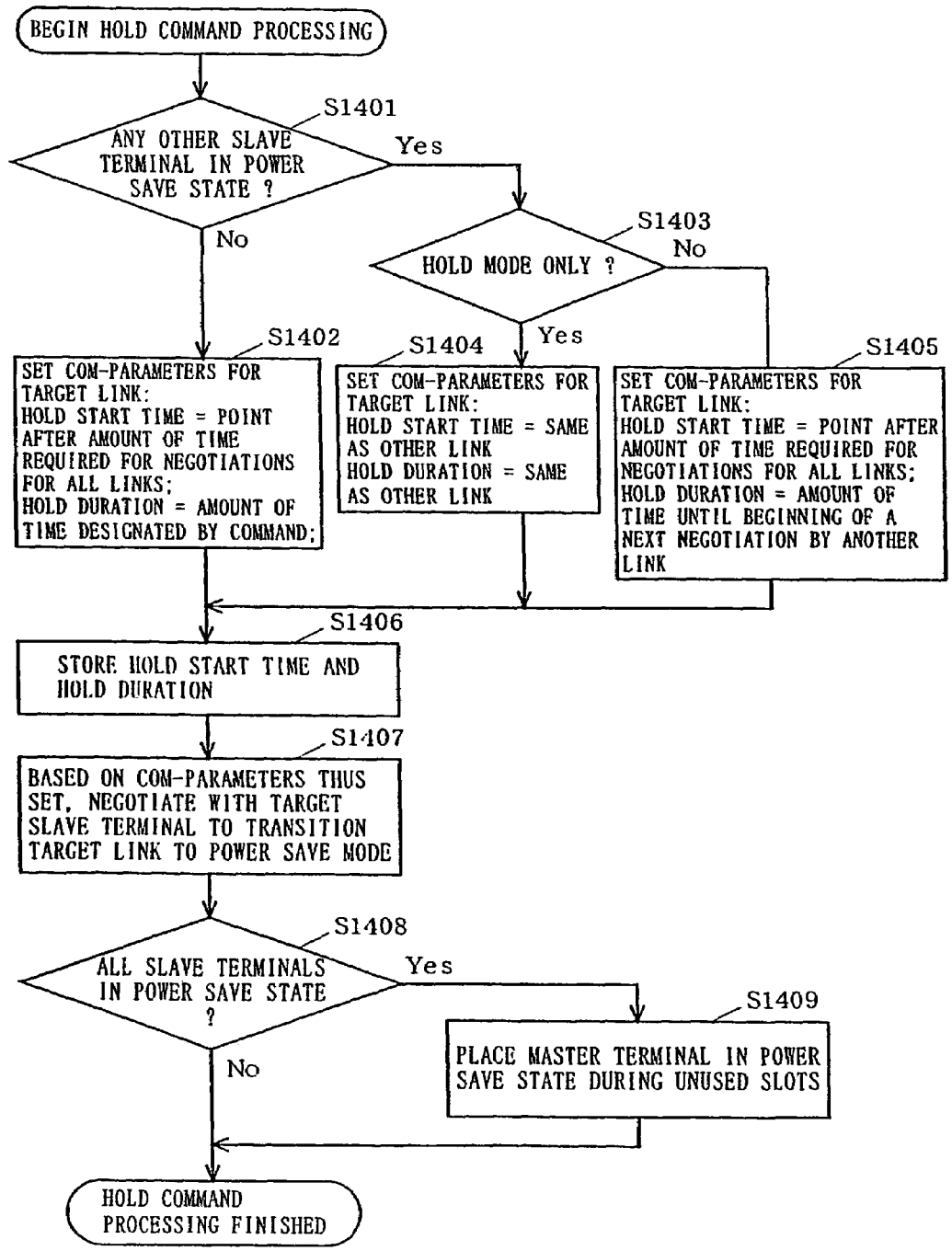
FIG. 14 is a flowchart illustrating a procedure of the power save processing method according to a third embodiment of the present invention (hold mode)

Referring to FIG. 14, when a hold command which is issued for a target slave communication terminal is received from the user input section 10, the communication parameter adjustment section 24 confirms whether there is any other slave communication terminal which is operating in a power save state, by referring to the content stored in the power save state storage section 25 (step S1401). If there is no other slave communication terminal which is operating in a power save state, the communication parameter adjustment section 24 sets the "hold start time" for the target communication link at a point which falls after the lapse of an amount of time required for the negotiations for all of the currently-established communication links, and sets the "hold duration" for the target communication link at a value designated by the command (step S1402). On the other hand, if there are any other slave communication terminals which are operating in a power save state, the communication parameter adjustment section 24 determines whether all such slave communication terminals are operating in the hold mode only (step S1403). If they are operating in only the hold mode, the communication parameter adjustment section 24 sets the "hold start time" and the "hold duration" for the target communication link at the values that are set for the other communication links (step S1404). If any mode other than the hold mode exists, the communication parameter adjustment section 24 sets the "hold start time" for the target communication link at a point which falls after the lapse of an amount of time required for the negotiations for all of the currently-established communication links, and sets the "hold duration" for the target communication link so as to define an amount of time until the beginning of a next negotiation to be performed by another communication link (step S1405). The hold start time and the hold duration thus set are stored to the power save state storage section 25 (step S1406).

Based on the hold start time and hold duration having been set by the communication parameter adjustment section 24, the communication link management section 21, the communication link control section 22, and the power save operation control section 23 negotiate with the target slave communication terminal so as to cause the target communication terminal to perform power save operation in the hold mode in accordance with such communication parameters(step S1407). Next, by referring to the content stored in the power save state storage section 25, the communication parameter adjustment section 24 determines whether all the slave communication terminals having communication links established thereto are operating in a power save state or not (step S1408). If all such slave communication terminals are operating in a power save state, the communication parameter adjustment section 24 causes the master communication terminal to perform power save operation in the hold mode during a period which begins at the hold start time and lasts until the hold duration expires, i.e., a period corresponding to unused slots (step S1409).

Figure 17:
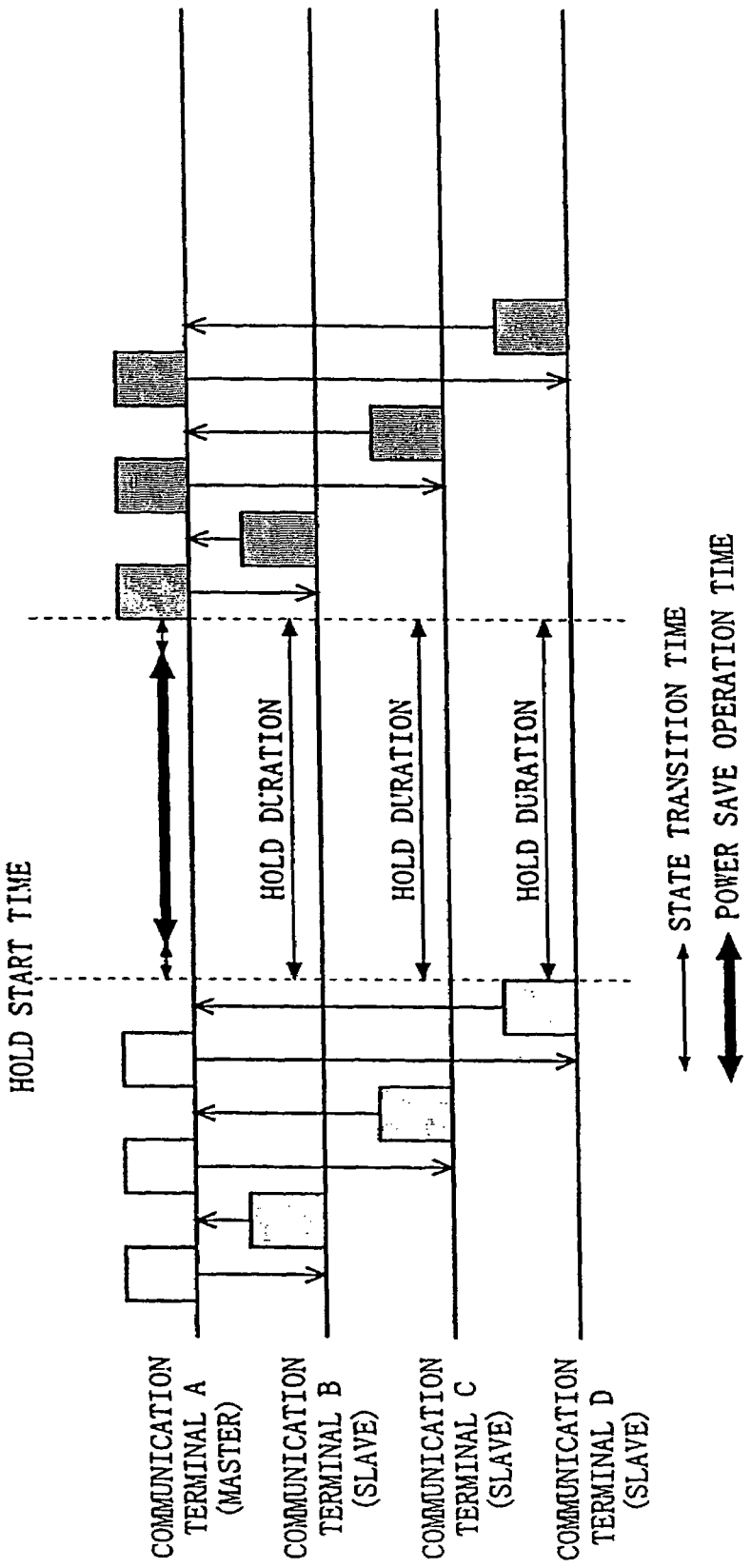
FIG. 17 is a chart illustrating how communication slots for asynchronous communication links established between a master communication terminal and a plurality of slave communication terminals may be adjusted when a power save processing method is performed according to the procedure shown in FIG. 14.

Through the above procedure, unused slots can be huddled together so as to span one continuous range as shown in FIG. 17 (where all communication links are in the hold mode). This makes it possible to place the master communication terminal in a power save state continuously during such a range of time.

(2) When Receiving a Sniff Command

Figure 15:
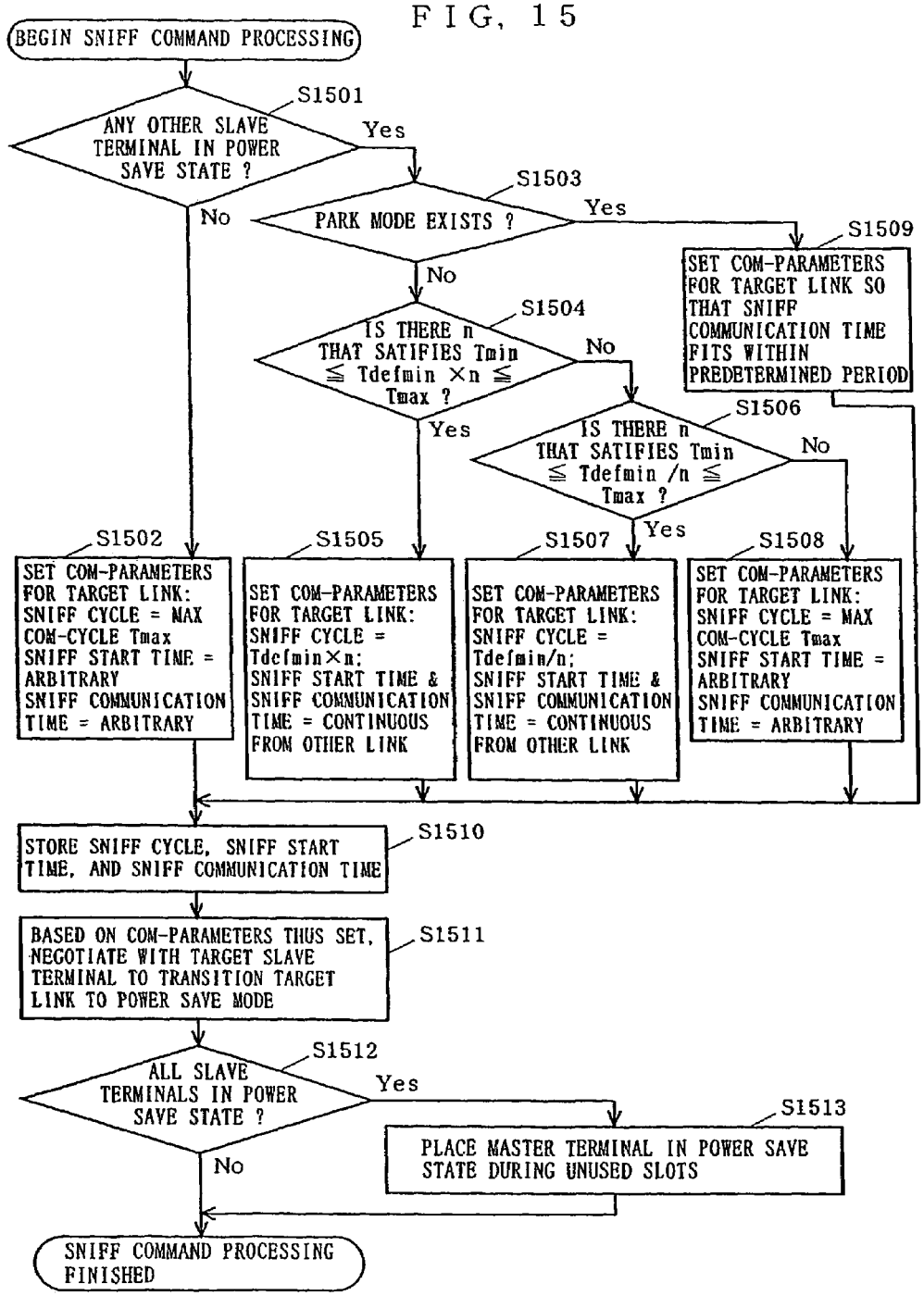
FIG. 15 is a flowchart illustrating a procedure of the power save processing method according to the third embodiment of the present invention (sniff mode)

Referring to FIG. 15, when a sniff command (which designates a permissible range Tmin to Tmax of the communication cycle) issued for a target slave communication terminal is received from the user input section 10, the communication parameter adjustment section 24 confirms whether there is any other slave communication terminal which is operating in a power save state, by referring to the content stored in the power save state storage section 25 (step S1501). If there is no other slave communication terminal which is operating in a power save state, the communication parameter adjustment section 24 sets the "sniff cycle" for the target communication link at the maximum communication cycle value Tmax, and sets the sniff start time and the sniff communication time at arbitrary values (step S1502). On the other hand, if there are any other slave communication terminals which are operating in a power save state, the communication parameter adjustment section 24 determines whether the park mode exists among such slave communication terminals (step S1503). If the park mode exists, the communication parameter adjustment section 24 sets the "sniff cycle", "sniff start time", and "sniff communication time" for the target communication link so that the sniff communication time fits within predetermined period ① or ② (described later) (step S1509). If the park mode does not exist, the communication parameter adjustment section 24 extracts the minimum communication cycle Tdefmin among the communication cycles Tdef which are set for all the other communication links, and determines whether there exists a natural number n which satisfies the relationship Tmin≦Tdefmin×n≦Tmax (step S1504).

If step S1504 finds that such a natural number n exists, the communication parameter adjustment section 24 sets the "sniff cycle" for the target communication link at Tdefmin×n (note that where a plurality of values for n exist, the largest n value is to be selected), sets the "sniff start time" at a point in time at which the sniff communication time of the other slave communication terminal that uses the communication cycle Tdefmin expires, and sets the "sniff communication time" at an amount of time required for the data transmission/reception (step S1505). On the other hand, if step S1504 finds that no such natural number n exists, the communication parameter adjustment section 24 further determines whether there exists a natural number n which satisfies the relationship Tmin≦Tdefmin/n≦Tmax (step S1506).

If step S1506 finds that such a natural number n exits, the communication parameter adjustment section 24 sets the "sniff cycle" for the target communication link at Tdefmin/n (note that where a plurality of values for n exist, the smallest n value is to be selected), sets the "sniff start time" at a point in time at which the sniff communication time of the other slave communication terminal that uses the communication cycle Tdefmin expires, and sets the "sniff communication time" at an amount of time required for the data transmission/reception (step S1507). On the other hand, if step S1506 finds that no such natural number n exists, the communication parameter adjustment section 24 sets the "sniff cycle" for the target communication link at the maximum value Tmax in the designated permissible range, sets the "sniff start time" at a point in time at which the sniff communication time with any other arbitrary slave communication terminal expires, and sets the "sniff communication time" at an amount of time required for the data transmission/reception (step S1508). The sniff start time, the sniff communication time, and the sniff cycle thus set are stored to the power save state storage section 25 (step S1510).

Based on the sniff start time, sniff communication time, and sniff cycle having been set by the communication parameter adjustment section 24, the communication link management section 21, the communication link control section 22, and the power save operation control section 23 negotiate with the target slave communication terminal so as to place the target communication terminal in the power save mode in accordance with such communication parameters (step S1511). Next, by referring to the content stored in the power save state storage section 25, the communication parameter adjustment section 24 determines whether all the slave communication terminals having communication links established thereto are operating in a power save state or not (step S1512). If all such slave communication terminals are operating in a power save state, the communication parameter adjustment section 24 places the hardware of the master communication terminal in a power save state during a period which begins after a round of communications are finished and lasts until the next round of communications begins, i.e., a period corresponding to unused slots (step S1513).

Through the above procedure, unused slots can be huddled together so as to span one continuous range as shown in FIG. 18 (where all communication links are in the sniff mode). This makes it possible to place the master communication terminal in a power save state continuously during such a range of time.

(3) When Receiving a Park Command

Figure 16:
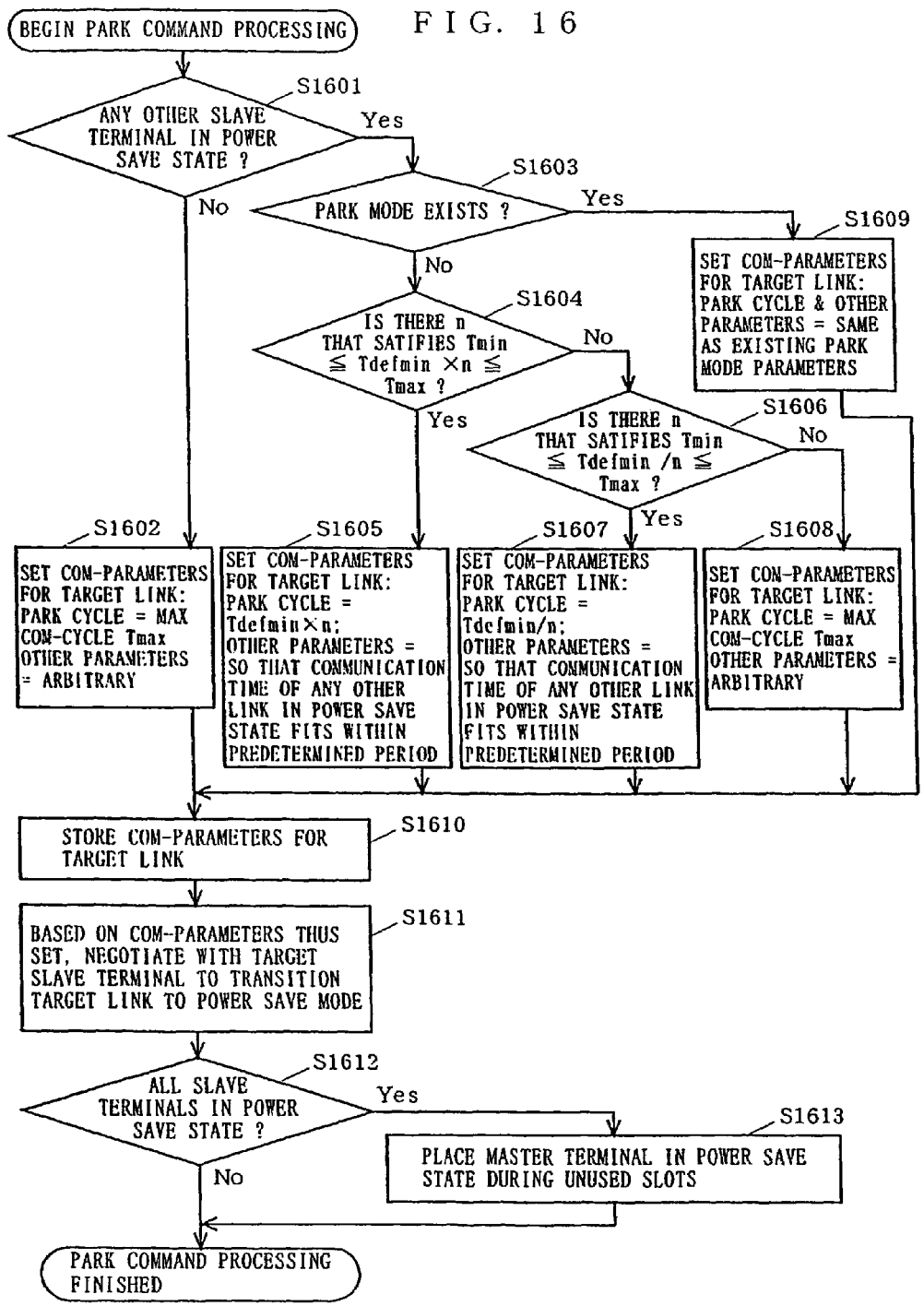
FIG. 16 is a flowchart illustrating a procedure of the power save processing method according to the third embodiment of the present invention (park mode)

Referring to FIG. 16, when a park command (which designates a permissible range Tmin to Tmax of the communication cycle, or, if any communication link exists that is already operating in the park mode, designates the communication cycle as designated by the already-existing park mode) issued for a target slave communication terminal is received from the user input section 10, the communication parameter adjustment section 24 confirms whether there is any other slave communication terminal which is operating in a power save state (hold mode, sniff mode, or park mode), by referring to the content stored in the power save state storage section 25 (step S1601). If there is no other slave communication terminal which is operating in a power save state, the communication parameter adjustment section 24 sets the "park cycle" for the target communication link at the maximum communication cycle value Tmax, and sets the other parameters at arbitrary values (step S1602). On the other hand, if there are any other slave communication terminals which are operating in a power save state, the communication parameter adjustment section 24 determines whether the park mode exists among such slave communication terminals by referring to the content stored in the power save state storage section 25 (step S1603). If the park mode exists, the communication parameter adjustment section 24 sets the communication cycle and other parameters for the target communication link at the same values as those associated with the existing park mode (step S1609). On the other hand, if the park mode does not exist, the communication parameter adjustment section 24 extracts the minimum communication cycle Tdefmin among the communication cycles Tdef which are set for all the other communication links, and determines whether there exists a natural number n which satisfies the relationship Tmin≦Tdefmin×n≦Tmax (step S1604).

Figure 19:
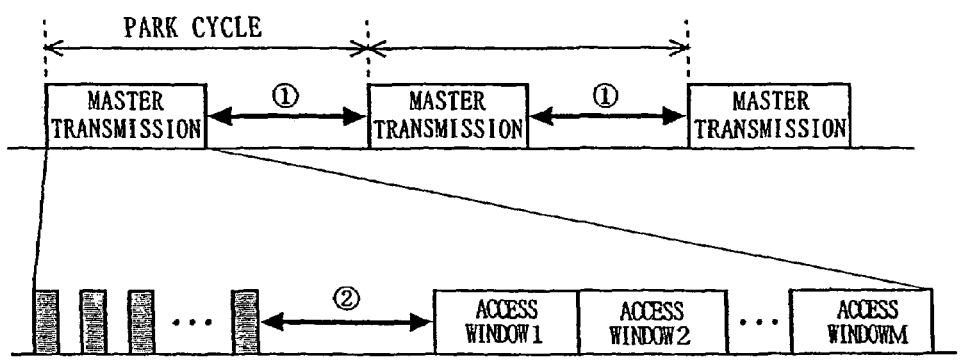
FIG. 19 is a chart illustrating communication slots to be used in the case where a park mode and a hold mode or/and a sniff mode are combined.

If step S1604 finds that such a natural number n exists, the communication parameter adjustment section 24 sets the "park cycle" for the target communication link at Tdefmin×n (note that where a plurality of values for n exist, the largest n value is to be selected), and sets the other parameters concerning the park mode so that, as shown in FIG. 19, the communication time of any existing communication link operating in the power save state fits within either a period during which no transmission from the master communication terminal in the park mode is performed (① in FIG. 19), or a period which begins after broadcast communications are completed and lasts until access windows begin (② in FIG. 19) (step S1605). On the other hand, if step S1604 finds that no such natural number n exists, the communication parameter adjustment section 24 further determines whether there exists a natural number n which satisfies the relationship Tmin≦ Tdefmin/n≦Tmax (step S1606).

If step S1606 finds that such a natural number n exits, the communication parameter adjustment section 24 sets the park cycle for the target communication link at Tdefmin/n (note that where a plurality of values for n exist, the smallest n value is to be selected), and sets the other parameters concerning the park mode so that the communication time of any existing communication link operating in the power save state fits within either the aforementioned period ① or ② (see FIG. 19) (step S1607). On the other hand, if step S1606 finds that no such natural number n exists, the communication parameter adjustment section 24 sets the "park cycle" for the target communication link at the maximum communication cycle value Tmax, and sets the other parameters at arbitrary values (step S1608). The communication cycle and the other parameters thus set are stored to the power save state storage section 25 (step S1610).

Based on the park cycle and the other parameters having been set by the communication parameter adjustment section 24, the communication link management section 21, the communication link control section 22, and the power save operation control section 23 negotiate with the target slave communication terminal so as to place the target communication terminal in the power save mode in accordance with such communication parameters (step S1611). Next, by referring to the content stored in the power save state storage section 25, the communication parameter adjustment section 24 determines whether all the slave communication terminals having communication links established thereto are operating in a power save state or not (step S1612). If all such slave communication terminals are operating in a power save state, the communication parameter adjustment section 24 places the hardware of the master communication terminal in a power save state during a period which begins after a round of communications are finished and lasts until the next round of communications begins, i.e., a period corresponding to unused slots (step S1613).

Figure 20:
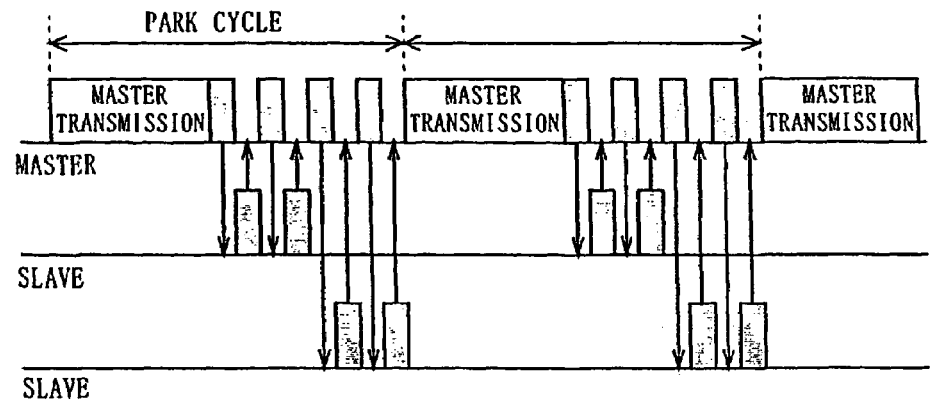
FIG. 20 is a chart illustrating how communication slots for asynchronous communication links established between a master communication terminal and a plurality of slave communication terminals may be adjusted when a power save processing method is performed according to the procedure shown in FIG. 16.

Through the above procedure, unused slots can be huddled together so as to span one continuous range as shown in FIG. 20. This makes it possible to place the master communication terminal in a power save state continuously during such a range of time. FIG. 20 illustrates an example where the sniff communication time is fitted within the aforementioned period ①.

By performing the processes described in cases (1) to (3) above, the power save processing method according to the first and second embodiments can be applied under the Bluetooth specification.

The third embodiment above merely illustrates one possible example. The power save processing method according to the first embodiment or the power save processing method according to the second embodiment can be applied to: i) the hold mode only; ii) the sniff mode only; iii) combination of the hold mode and the sniff mode; iv) combination of the hold mode and the park mode; v) combination of the sniff mode and the park mode; or vi) combination of all of the three modes. It will be appreciated that the "detection", "detection scan", and "connection scan" operations which were described as part of the preparatory operation described in the second embodiment above, correspond to Inquiry, Inquiry Scan, and Page Scan under the Bluetooth specification, respectively.

Figure 21:
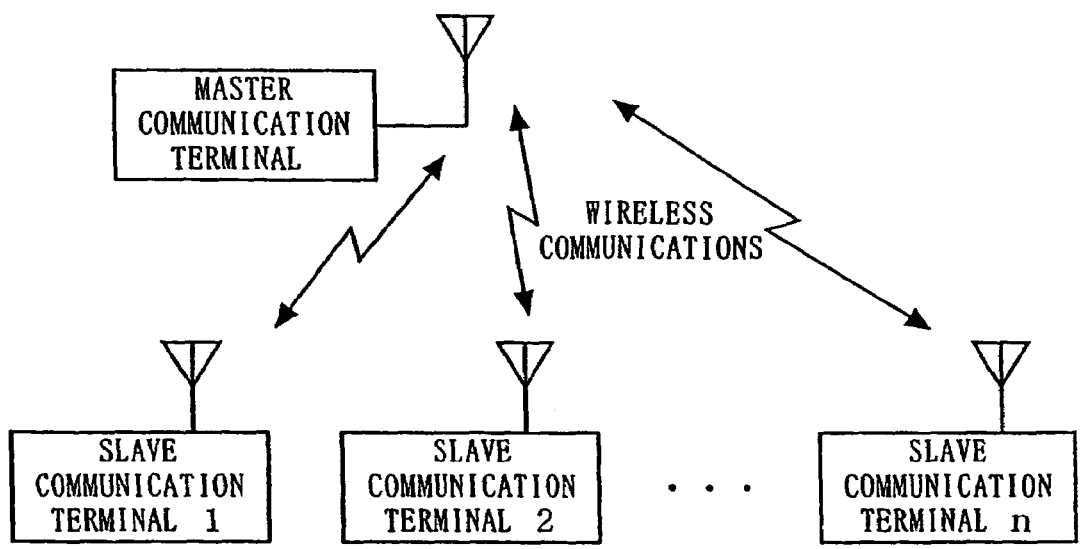
FIG. 21 is a diagram illustrating a wireless communication system to which the power save processing method according to the present invention is applicable.
Figure 22:
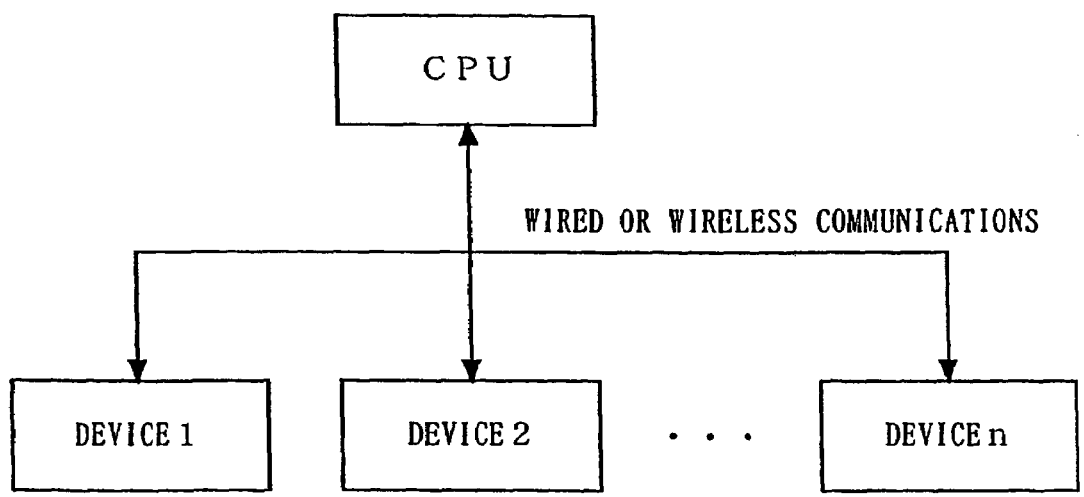
FIG. 22 is a diagram illustrating another system configuration to which the power save processing method according to the present invention is applicable.

The above embodiments illustrate examples where the power save processing method according to the present invention is applied to a wireless communication system comprising one master communication terminal and a plurality of slave communication terminals (FIG. 21). Another exemplary system to which the power save processing method according to the present invention is applicable would be a computer or the like, where the CPU (central processing unit) can be seen as a master communication terminal whereas any device (e.g., an internal device such as a memory set or a peripheral device such as a mouse or a printer) to be accessed by the CPU can be seen as a slave communication terminal (see FIG. 22). In this case, the communication slots used by the CPU in accessing each device may be adjusted by any of the methods described in the above embodiments to allow the CPU to efficiently perform in a power save state.

INDUSTRIAL APPLICABILITY

The communication terminal and the power save processing method to be performed by the communication terminal according to the present invention are useful, for example, in the case where a plurality of communication links are to be concurrently established with a plurality of other communication terminals, where there is a desire to achieve an efficient power save operation at the communication terminal.

The invention claimed is:

1. A communication terminal capable of concurrently establishing communication links with a plurality of slave communication terminals, comprising:
   a storage section operable to store, with respect to each slave communication terminal having a communication link established thereto: a communication cycle for the communication link, a communication slot to be used by the communication link, and information concerning whether the communication link is in a predetermined power save mode for performing a predetermined power save operation;
   an input section operable to receive a request, directed to one or more of the plurality of slave communication terminals having a communication link established thereto, to cause the one or more slave communication terminals to transition to the power save mode;
   an adjustment section operable to adjust the communication slots used by the communication links to all slave communication terminals to which the request is directed so that the communication slots together span a continuous range, the adjustment being made by referring to a content stored in the storage section each time the input section receives the request;
   a control section operable to, in accordance with the communication slots having been adjusted by the adjustment section, cause each slave communication terminal to transition to the power save mode, and storing information indicating that the slave communication terminal is in the power save mode to the storage section; and
   an execution section operable to, after all of the slave communication terminals having communication links established thereto have transitioned to the power save mode, place the communication terminal itself in a power save state during unused slots.

2. The communication terminal according to claim 1, wherein,
a permissible communication cycle range for a communication link to be established is defined for each slave communication terminal, and
if there is an overlap among the permissible communication cycle ranges of all slave communication terminals to which the request is directed, the adjustment section adjusts the communication cycle of each communication link with all such slave communication terminals so as to be a communication cycle within the overlap.

3. The communication terminal according to claim 2, wherein the adjustment section adjusts the communication cycle of each communication link to be a maximum value within the overlap.

4. The communication terminal according to claim 1, wherein,
a permissible communication cycle range for a communication link to be established is defined for each slave communication terminal, and
if there is no overlap among the permissible communication cycle ranges of all slave communication terminals to which the request is directed, the adjustment section adjusts the communication cycle of each communication link with all such slave communication terminals so as to satisfy the permissible communication cycle range of each slave communication terminal and to be a multiple of an arbitrary reference communication cycle, such that the communication slots to be used by the communication links together span one continuous range at multiples of the reference communication cycle.

5. The communication terminal according to claim 1, wherein the unused slots during which the communication terminal is placed in a power save state by the execution section are slots which fall outside of communicating periods with any of the plurality of slave communication terminals and outside of a predetermined period required to perform a preparatory operation for establishing a new communication link with a communication terminal to which no communication link is currently established.

6. The communication terminal according to claim 1, wherein,
the communication links with the plurality of slave communication terminals are to be established according to the Bluetooth™ specification, and
the power save mode of each slave communication terminal is at least one of a hold mode and a sniff mode defined according to the Bluetooth™ specification.

7. The communication terminal according to claim 6, wherein,
at least one of the hold mode and the sniff mode is combined with a park mode defined according to the Bluetooth™ specification, and
the adjustment section adjusts the communication cycles and communication slots of the relevant communication links so that a hold duration defined under the hold mode and/or a sniff communication time defined under the sniff mode fit within a period during which a master communication terminal does not perform transmission as defined under the park mode and/or a period which begins after broadcast communications are completed and lasts until access windows begin.

8. The communication terminal according to claim 6, wherein the unused slots during which the communication terminal is placed in a power save state by the execution section are slots which fall outside of communicating periods with any of the plurality of slave communication terminals and outside of a predetermined period required to periodically perform a detection (Inquiry) operation, a detection scan (Inquiry Scan) operation, and a connection scan (Page Scan) operation.

9. A power save processing method to be performed by a communication terminal capable of concurrently establishing communication links with a plurality of slave communication terminals, comprising the steps of:
receiving a request, directed to one or more of the plurality of slave communication terminals having a communication link established thereto, to cause the one or more slave communication terminals to transition to a predetermined power save mode for performing a predetermined power save operation;
each time the input section receives the request, adjusting the communication slots used by the communication links to all slave communication terminals to which the request is directed so that the communication slots together span a continuous range;
in accordance with the communication slots having been adjusted, causing each slave communication terminal to transition to the power save mode; and
after all of the slave communication terminals having communication links established thereto have transitioned to the power save mode, placing the communication terminal itself in a power save state during unused slots.

10. A program to be executed by a communication terminal capable of concurrently establishing communication links with a plurality of slave communication terminals, comprising the steps, performed by the communication terminal, of:
receiving a request, directed to one or more of the plurality of slave communication terminals having a communication link established thereto, to cause the one or more slave communication terminals to transition to a predetermined power save mode for performing a predetermined power save operation;
each time the input section receives the request, adjusting the communication slots used by the communication links to all slave communication terminals to which the request is directed so that the communication slots together span a continuous range;
in accordance with the communication slots having been adjusted, causing each slave communication terminal to transition to the power save mode; and
after all of the slave communication terminals having communication links established thereto have transitioned to the power save mode, placing the communication terminal itself in a power save state during unused slots.

11. A computer-readable recording having recorded thereon a program to be executed by a communication terminal capable of concurrently establishing communication links with a plurality of slave communication terminals, comprising the steps, performed by the communication terminal, of:
receiving a request, directed to one or more of the plurality of slave communication terminals having a communication link established thereto, to cause the one or more slave communication terminals to transition to a predetermined power save mode for performing a predetermined power save operation;

each time the input section receives the request, adjusting the communication slots used by the communication links to all slave communication terminals to which the request is directed so that the communication slots together span a continuous range;

in accordance with the communication slots having been adjusted, causing each slave communication terminal to transition to the power save mode; and after all of the slave communication terminals having communication links established thereto have transitioned to the power save mode, placing the communication terminal itself in a power save state during unused slots.

* * * * *